Jan. 10, 1967  W. E. BOUNDS  3,296,949
CAMERA
Filed April 20, 1961  14 Sheets-Sheet 1

INVENTOR.
WILLIAM E. BOUNDS
BY
Huebner & Worrel
ATTORNEYS.

Jan. 10, 1967  W. E. BOUNDS  3,296,949
CAMERA
Filed April 20, 1961  14 Sheets-Sheet 2
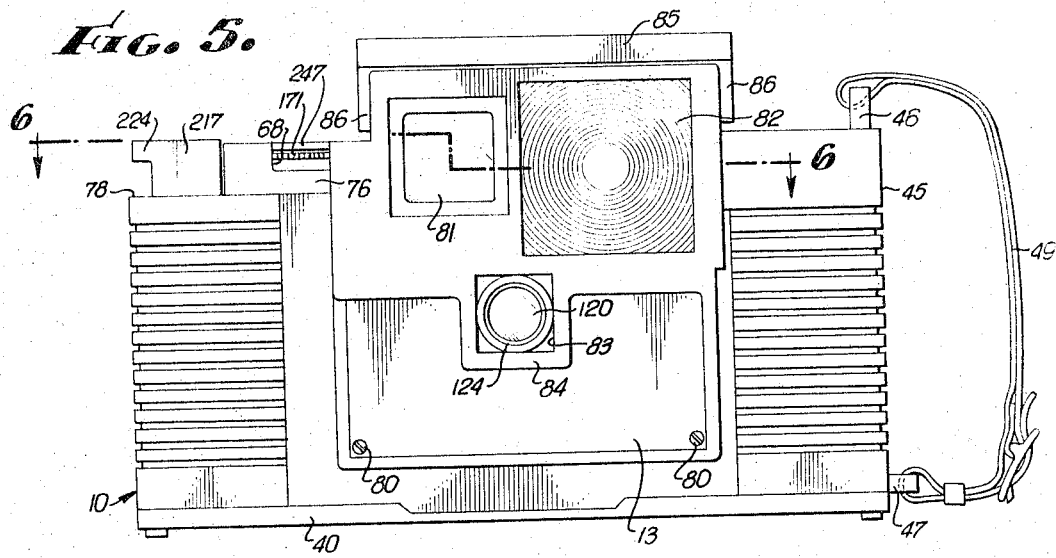
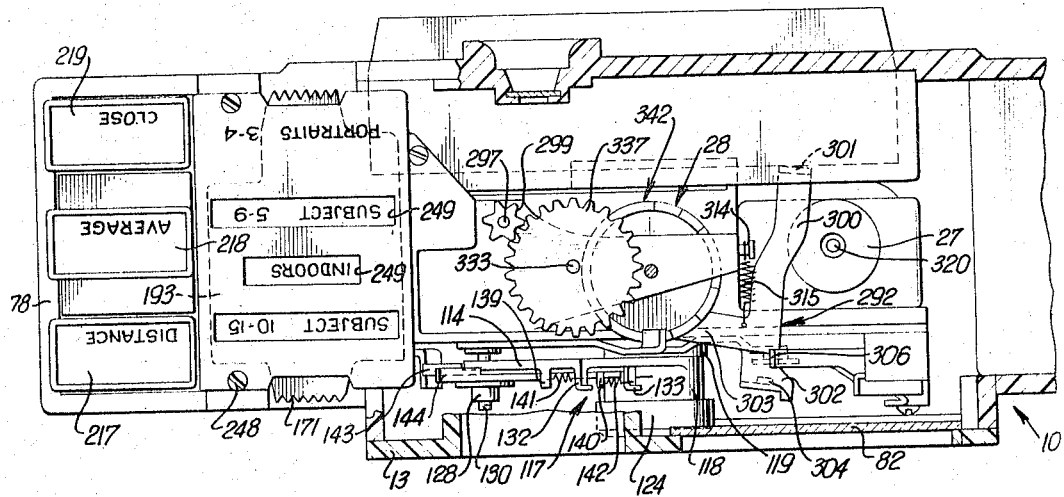
INVENTOR.
WILLIAM E. BOUNDS
BY
Huebner & Worrel
ATTORNEYS.

Jan. 10, 1967   W. E. BOUNDS   3,296,949
CAMERA
Filed April 20, 1961   14 Sheets-Sheet 3

INVENTOR.
WILLIAM E. BOUNDS
BY Huebner & Worrel
ATTORNEYS.

Jan. 10, 1967 W. E. BOUNDS 3,296,949
CAMERA
Filed April 20, 1961 14 Sheets-Sheet 4

INVENTOR.
WILLIAM E. BOUNDS
BY Huebner & Worrel
ATTORNEYS.

INVENTOR.
WILLIAM E. BOUNDS
BY
Huebner & Worrel
ATTORNEYS.

Jan. 10, 1967  W. E. BOUNDS  3,296,949
CAMERA
Filed April 20, 1961  14 Sheets-Sheet 6

INVENTOR.
WILLIAM E. BOUNDS
BY
Huebner & Worrel
ATTORNEYS.

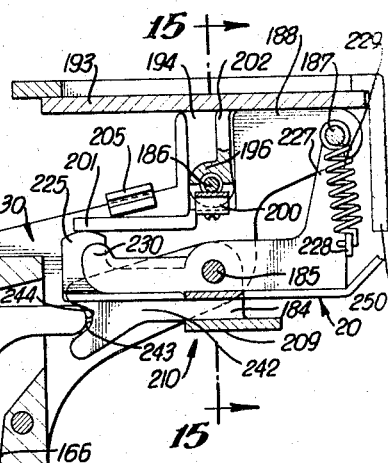
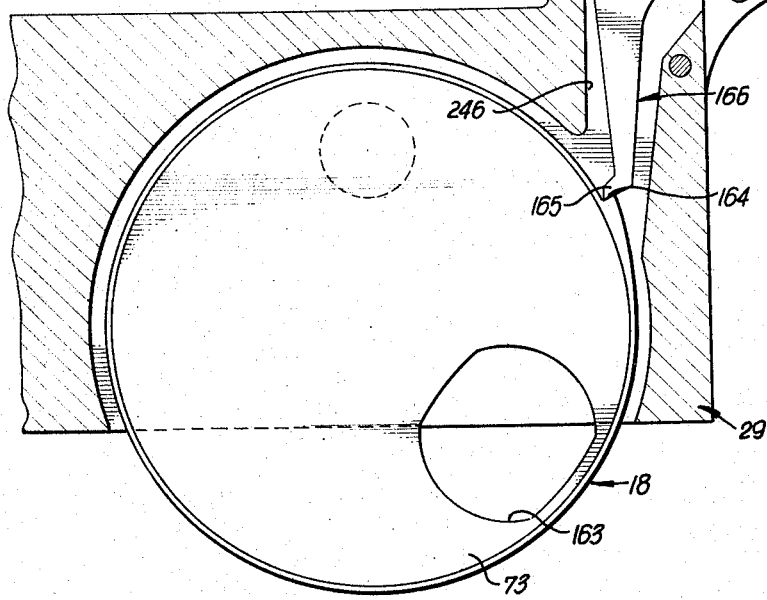
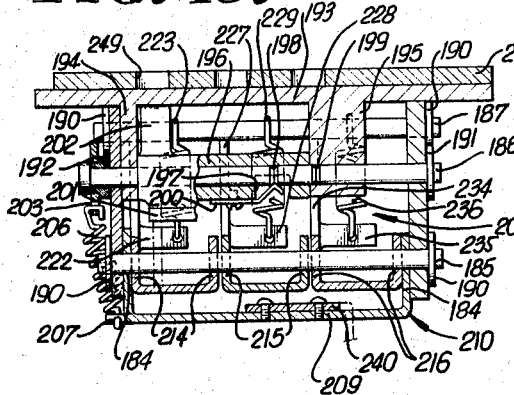
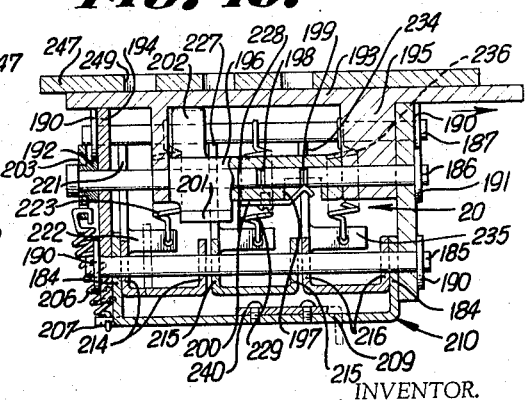

Jan. 10, 1967  W. E. BOUNDS  3,296,949
CAMERA
Filed April 20, 1961  14 Sheets-Sheet 8

INVENTOR.
WILLIAM E. BOUNDS
BY
Huebner & Worrel
ATTORNEYS.

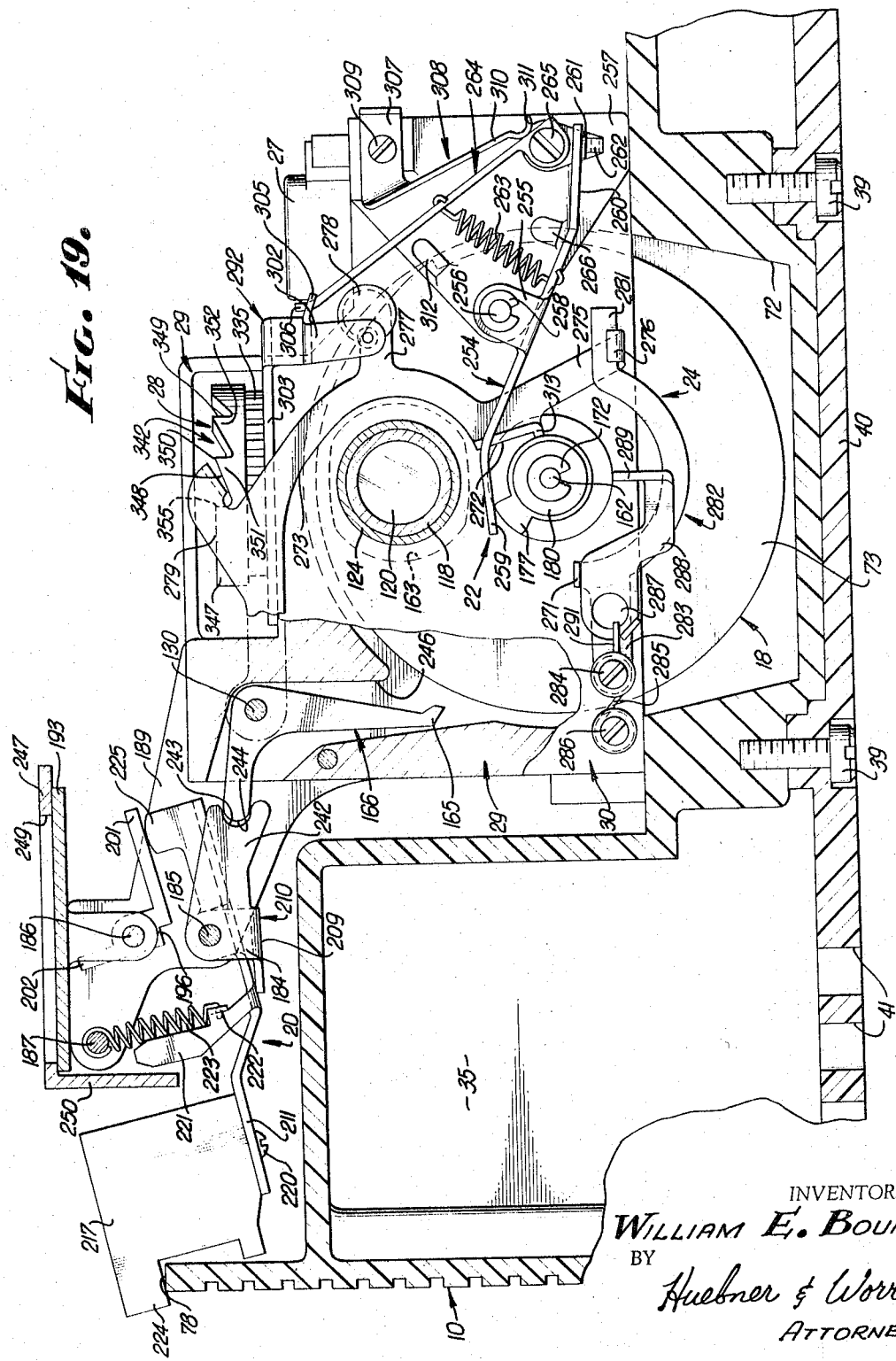

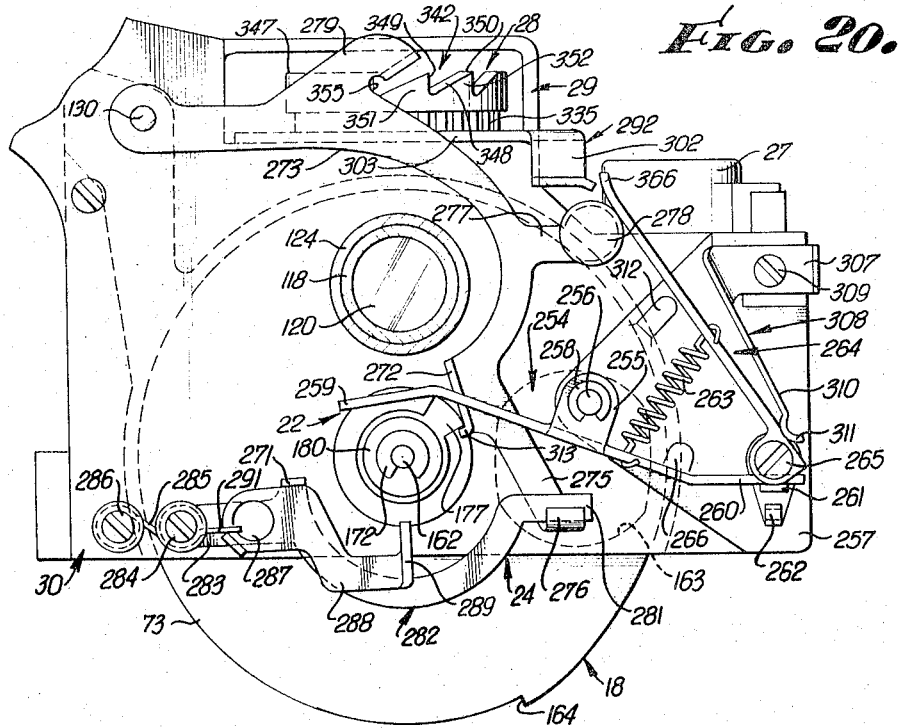
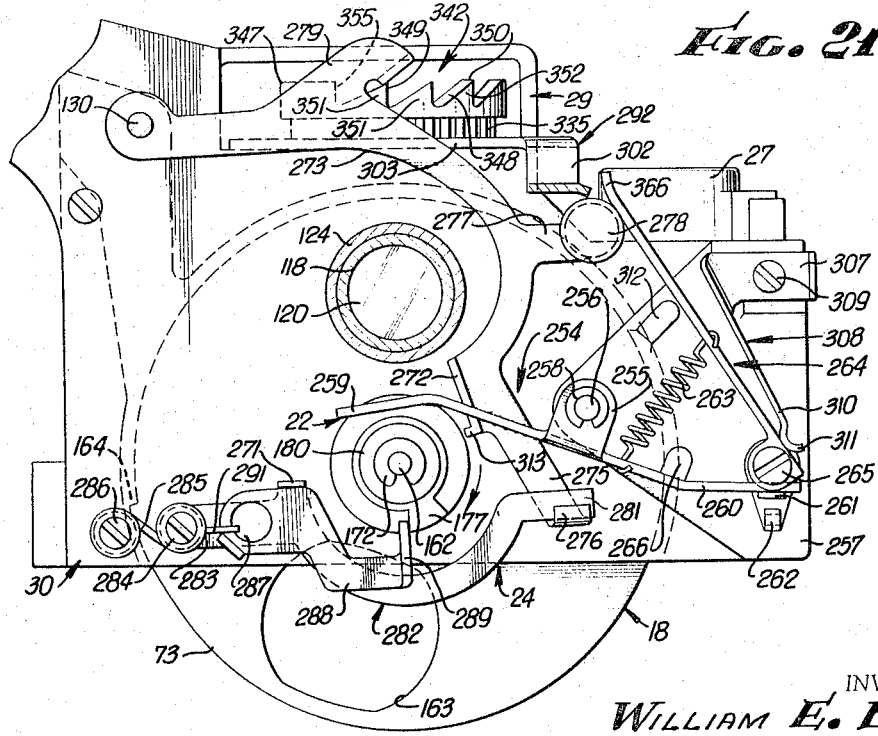

Jan. 10, 1967 W. E. BOUNDS 3,296,949
CAMERA
Filed April 20, 1961 14 Sheets-Sheet 11

INVENTOR.
WILLIAM E. BOUNDS
BY
Huebner & Worrel
ATTORNEYS.

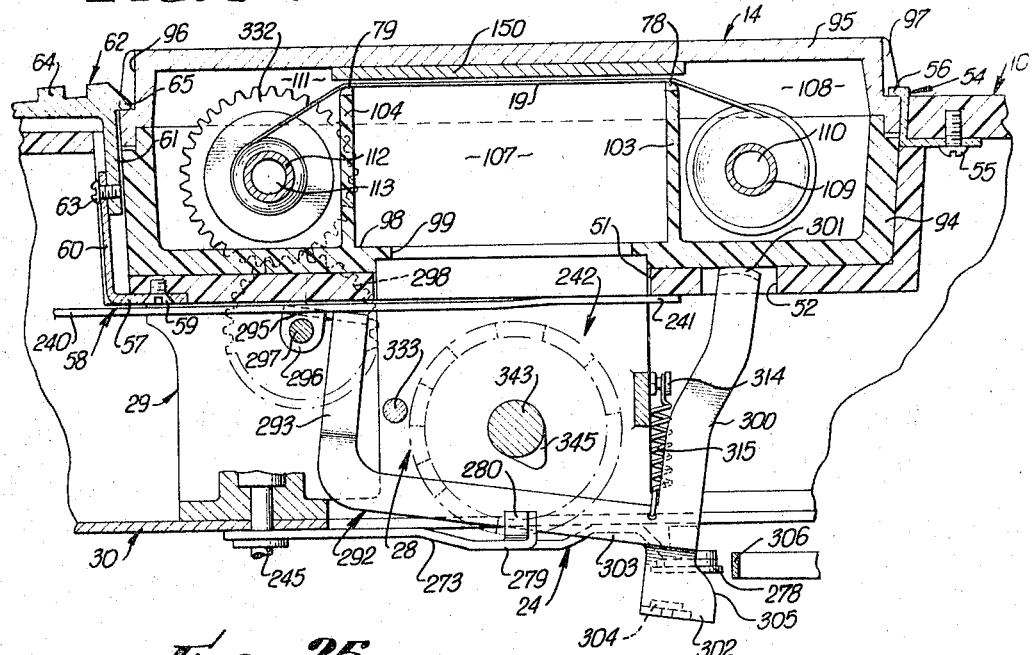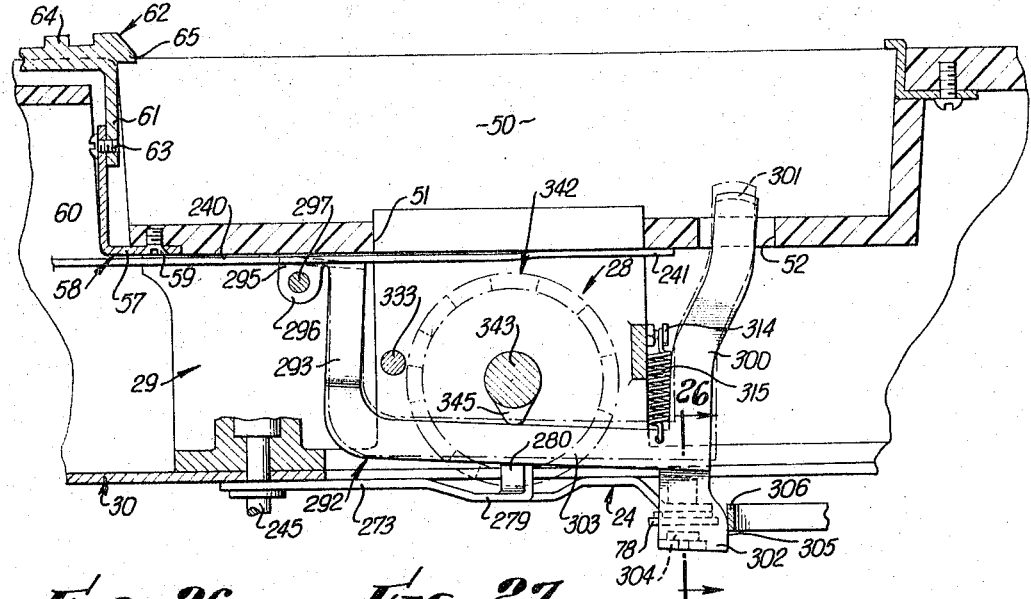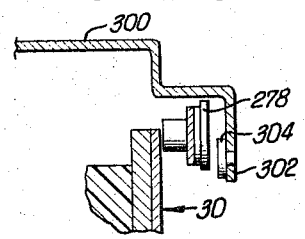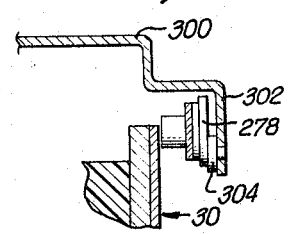

Jan. 10, 1967 W. E. BOUNDS 3,296,949
CAMERA
Filed April 20, 1961 14 Sheets-Sheet 13

INVENTOR.
WILLIAM E. BOUNDS
BY
Huebner & Worrel
ATTORNEYS.

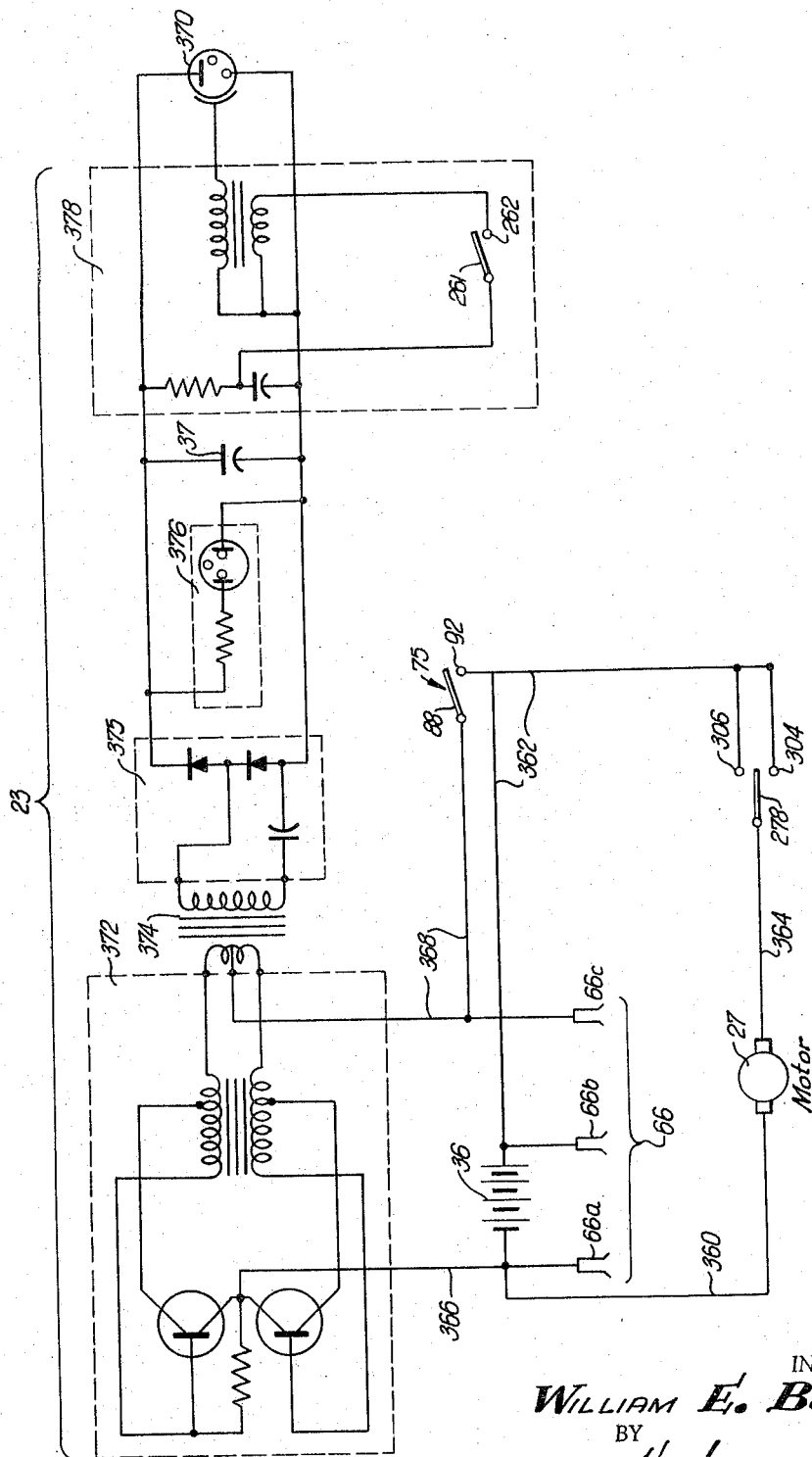

3,296,949
CAMERA
William E. Bounds, 1205 Pine Ave.,
Manhattan Beach, Calif. 90266
Filed Apr. 20, 1961, Ser. No. 104,378
12 Claims. (Cl. 95—11)

This invention relates to photographic equipment and more particularly to a camera that has automatic features incorporated therein.

A major object of this invention is to provide a camera having a manually operable linkage system that adjusts the focus and aperture of a lens unit, and actuates a shutter assembly to expose a frame of film spaced from and in alignment with the lens unit.

Another object of this invention is to provide a shutter assembly for a camera that when actuated, in turn sequentially actuates mechanism to, first, energize, momentarily, a light source to illuminate the picture subject, and to, second, energize a driving means to advance the film from an exposed frame to an unexposed frame.

A yet further object of this invention is to provide a camera of the character described wherein structure actuated by and connected to the film driving means meters the advancement of the film from the lead-in portion through the incremental advancement of each frame of the film, to the tail-end portion.

A still further object of this invention is to provide a camera of the character described wherein the film is contained within a unique magazine which is removably attached to the camera case, and when attached is mechanically coupled and actuated by the film driving means within the camera case.

An additional object of this invention is to include in a film magazine and camera of the character described provisions for indexing each exposed frame of film.

Another object of this invention is to provide a manually operable linkage system of the character described wherein the linkage system includes a plurality of finger operated levers at least one of which actuates an apertured blade to alter the aperture of the lens unit, and at least one of which levers actuates the lens unit to alter the focus.

An additional object of this invention is to provide in a camera of the character described a metering structure which includes a metering control cam disc that has irregularly disposed teeth thereon which in cooperation with a linkage system meters and limits the advancement of the lead-in portion of the film, meters and limits the advancement of the film from frame-to-frame, and meters and limits the advancement of the tail-end portion of the film.

A yet further object of this invention is to provide a lens unit for a camera of the character described which includes a plurality of apertured blades that when actuated alter the aperture of the lens, and mechanism that when actuated alters the focus of the lens.

A still further object of this invention is to provide a camera of the character described which includes a manually operable linkage system that actuates the focus mechanism and apertured blades of the lens unit, and which may be selectively adjusted so that the focus and aperture adjustment of the lens unit may be utilized for both indoor and outdoor photographs.

Briefly, the invention comprises a camera that incorporates a multiplicity of automatic features that materially reduce the possibility of human error and at the same time provide maximum assurance that the best available photographs will be obtained.

Focusing of the lens, determination of the proper lens aperture, the indexing of each frame of exposed film, actuation of the shutter of a shutter assembly, energizing of a source of light to illuminate the picture subject, and the advancement of the film from an exposed frame to an unexposed frame, are all accomplished by the single initial act of selectively depressing one of several finger actuated levers. Depression of one of the levers initiates a sequence of operations: Substantially simultaneously with the partial depression of the lever the aperture and focus of the lens is selected. Complete depression of the lever actuates the shutter of a shutter assembly to expose a frame of the film, and actuation of the shutter initiates a further sequence of operations which includes, first, the actuation of a first linkage system that momentarily closes an electrical circuit to energize the source of light to illuminate the picture subject and at the same time the same source of light indexes the film for subsequent editing. Secondly, the shutter assembly actuates a second linkage system which momentarily closes an electric circuit to energize a motor. The motor in turn actuates a driving means that is mechanically coupled to metering structure and a unique film loaded magazine.

The metering structure in cooperation with the second linkage system automatically meters and limits the advancement of the film from frame to frame. Additionally, provision is made in the camera for taking photographs indoors as well as outdoors and each of the finger actuated levers automatically sets the lens aperture and focus to take photographs under varying indoor and outdoor conditions.

The metering structure, in cooperation with the second linkage system and the magazine, and in the absence of actuating one of the finger levers, meters and limits the lead-in portion of the film when the magazine is attached to the camera case and meters and limits the advancement of the tail-end portion of the film when the last frame of the film is exposed.

Other objects and advantages of the present invention will become apparent from the following detailed description when taken in conjunction with the appended drawings, wherein:

FIGURE 5 is a front view of the camera with the dust cover in the open position.

FIGURE 6 is a cross-sectional view taken on line 6—6 of FIGURE 5, structure being broken away to illustrate details of construction.

FIGURE 14 is an enlarged cross-sectional view taken on line 14—14 of FIGURE 9.

FIGURE 15 is an operational, cross-sectional view taken on line 15—15 of FIGURE 14, and illustrating details of construction and location of parts when the manually operated linkage system is set for taking indoor photographs.

FIGURE 16 is an operational view similar to FIGURE 15, but illustrating the location of certain parts when the manually operated linkage system is set for taking outdoor photographs.

FIGURE 19 is an operational view illustrating the actuation of a shutter assembly by the manually operated linkage system, and the actuation of a linkage system by a cam on the shutter assembly, to close an electrical circuit to energize a light source.

FIGURE 20 is an operational view illustrating, primarily, the cooperative relationship of certain parts of a linkage system to that of film metering structure when a cam of the shutter assembly engages the linkage system.

FIGURE 21 is an operational view similar to FIGURE 20 but illustrating the subsequent relationship of the parts of the linkage system to that of the metering structure when the metering structure has been partially rotated and the cam has advanced to a temporarily restrained position.

FIGURE 24 is an operational, cross-sectional view taken on irregular line 24—24 of FIGURE 22, and illustrating the relationship of a film loaded magazine to the linkage system, the relationship of a cam on the film metering structure to the linkage system and the mechanical coupling of the film magazine to the film metering structure.

FIGURE 25 is an operational, cross-sectional view taken on line 25—25 of FIGURE 23, and illustrating the relationship of the cam on the film metering structure, to the linkage system when the tail-end portion of the film has been advanced in the film magazine and the magazine has been removed from the camera case.

FIGURE 26 is an operational, cross-sectional view taken on line 26—26 of FIGURE 25, and illustrating electrical contacts of the linkage system in the open position.

FIGURE 27 is an operational view similar to FIGURE 26, but illustrating the electrical contacts in the closed position.

FIGURE 32 is a wiring diagram illustrating, in simplified form, the presently preferred electrical circuitry of the camera.

Figure 1:
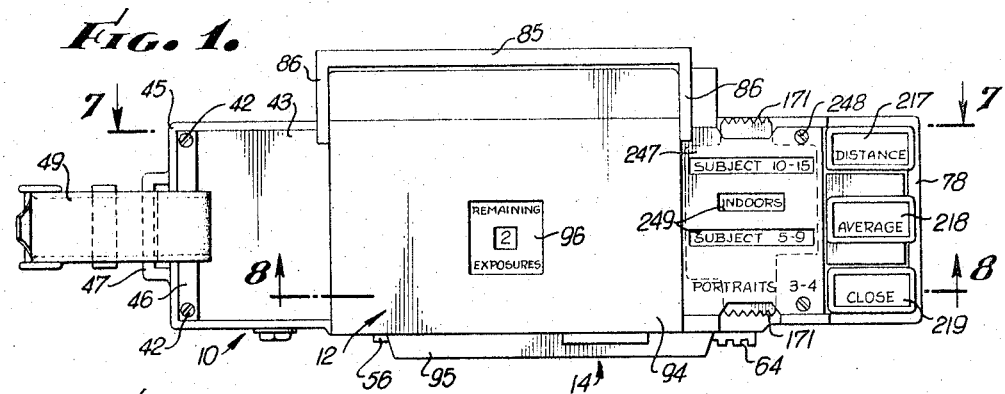
FIGURE 1 is a top view of a camera illustrating and having embodied therein the present invention, and showing that the operation of the camera is set for taking indoor photographs.

Referring to the drawings for a more detailed disclosure of the present invention, 10 broadly designates a compartmented camera case that includes an upper housing unit 12 and a front panel 13. Removably attached to the back of the case 10 is a film loaded magazine 14.

Disposed within the case 10 are a source of electrical power 15, a lens unit 16 and a spring loaded shutter assembly 18. The film 19, which is included as a component of the film magazine 14, is in alignment with the axis of the lens of the lens unit 16. The lens unit 16 and shutter assembly 18 are each actuated by a manually operable linkage system 20. The linkage system 20, among other things, includes mechanism that in cooperation with structure in the case 10 and magazine 14, under normal camera operation, indexes each frame of exposed film 19. The shutter assembly 18 sequentially actuates a first linkage system 22 that energizes and is electrically connected to a light source 23. A second linkage system 24, actuated by the shutter assembly 18 following the actuation of the first linkage system, is electrically connected to and energizes a driving means 26 that includes a motor 27. The driving means 26, in turn, is connected to and actuates a mechanism in the film magazine 14 to advance the film 19, is connected to and spring loads the shutter assembly 18, and is connected to and actuates film metering structure 28 to meter and limit the advancement of the film from the lead-in portion through the individual frames and through the tail-end portion.

The lens unit 16, shutter assembly 18, manually operable linkage system 20, the first and second linkage systems 22 and 24, the driving means 26, and the metering structure 28, are all mounted on and supported by an irregular shaped body 29 and plate 30, that is secured to the body 29 by screws 31. The body 29 and plate 30 may, if desired, be removable as a unit from the case 10 for servicing of the working parts connected thereto.

*Camera case 10*

FIGURES 1–3, 5–13, 17–19, 24, 25, 28 and 29, illustrate and show the various components of the camera case 10, the housing 12 and front panel 13.

The camera case 10 is preferably, but not necessarily, fabricated of a molded plastic material, such as Bakelite or the like.

Figure 7:
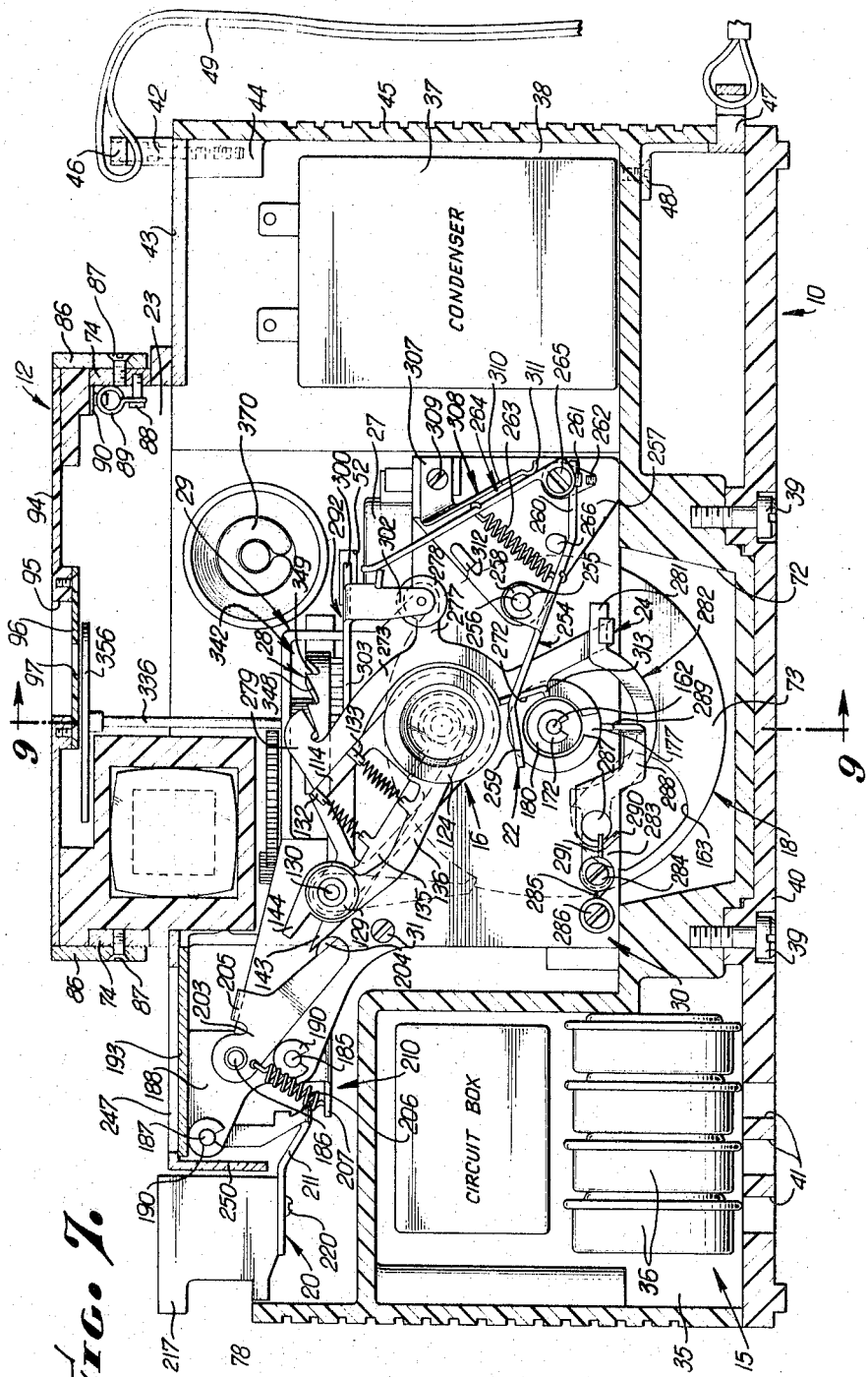
FIGURE 7 is an enlarged cross-sectional view taken on line 7—7 of FIGURE 1, and illustrating certain essential details of construction.

Disposed in one compartment 35 of the case 10 are a plurality of electrical cells 36, preferably of the rechargeable type, that comprise a battery; and in combination with a condenser 37, disposed in compartment 38, represent the electrical power source 15, FIGURE 7.

Screws 39 secure a bottom 40 to the case 10. Openings 41, formed in the bottom 40, are adapted to receive electrical connector means for introducing charging current to the batteries 36. By positioning the openings 41 in the bottom 40 of the camera, the camera may be set on a suitable charging device when not in use, with the connector means of the charger extending into the openings 41.

Fasteners 42 secure a plate 43 to a boss 44 that is integral with one end 45 of the case 10, plate 43 forming a cover for condenser compartment 38. An upstanding strap bracket 46 is integral with the plate 43. One end of a Z-shaped strap bracket 47 is secured internally of the case by fastener 48. The other end of the bracket 47 projects through an opening that is adjacent the bottom right side of the case 10. A carrying strap 49 is threaded through the brackets 46 and 47, FIGURE 7.

The upper left hand side of the case, looking from the front of the case as in FIGURE 7, provides a stop 78, the purpose of which will be subsequently described in greater detail.

The back of the case 10, FIGURE 25, has a recess 50 therein which accommodates the film magazine 14 in the manner illustrated in FIGURE 24. Also in the back of the case 10 are a relatively large opening 51 and a relatively small opening 52, FIGURES 24 and 25, and another relatively small opening 53, FIGURE 9.

A Z-shaped magazine clip 54 has one leg thereof which extends into the interior of case 10 where it is secured to the case by a fastener 55. The free end 56 of the clip 54 projects over the recess 50 from one side of recess 50 and is adapted to engage one side of the film magazine 14. One leg 57 of an L-shaped spring 58 is secured to the case 10 adjacent to the bottom of recess 50 by a fastener 59. The other leg 60 of spring 58 extends into the recess 50 at the side of recess 50 opposite the clip 54. One leg 61 of a magazine clip 62 is secured by a screw 63 to the leg 60. A second leg 64 of the clip 62 has a latching projection 65 thereon which engages the side of the film magazine 14 opposite the side engaged by the free end 56 of clip 54. The magazine 14 is snapped into the recess 50 in the case 10 by first sliding one side of magazine 14 under end 56 of clip 54, and then pushing the other side of magazine 14 past the latching projection 65 of clip 62, and is held by the free end 56 of clip 54 and the latching projection 65 on clip 62, until it is desired that the magazine be removed, FIGURES 24 and 25.

Figure 2:
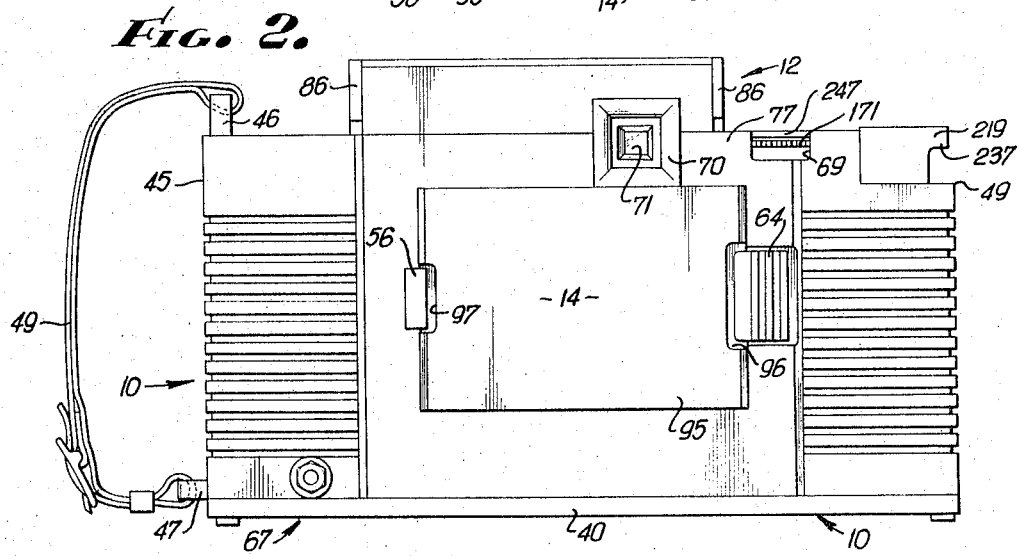
FIGURE 2 is a back view of the camera illustrating the attachment of a film magazine to the camera case.

Referring now to FIGURE 2, charging current input connector means is disposed in the bottom of case 10 so as to be accessible through the openings 41. Connector means 66 is electrically connected to the battery cells 36, as hereinafter described in detail in connection with the wiring diagram, FIGURE 32. A mating connector means which is electrically connected to an external source of direct current power may be engaged with connector means 66 for the purpose of recharging the cells 36 in the event rechargeable cells are used. If desired, a suitable rectifier unit (not shown) may be provided within the case 10 to receive alternating current from connector means 66 and to provide direct charging current to the cells 36.

A notch 68 is formed in the upper edge of the front wall 76 of the case 10, and a notch 69 is formed in the upper edge of the back wall 77 of the case 10, FIGURES 2 and 5. Also formed in the back wall of the case 10, FIGURES 2 and 6, is a recessed frame 70 in which is located the rear lens 71 of a viewfinder.

Figure 9:
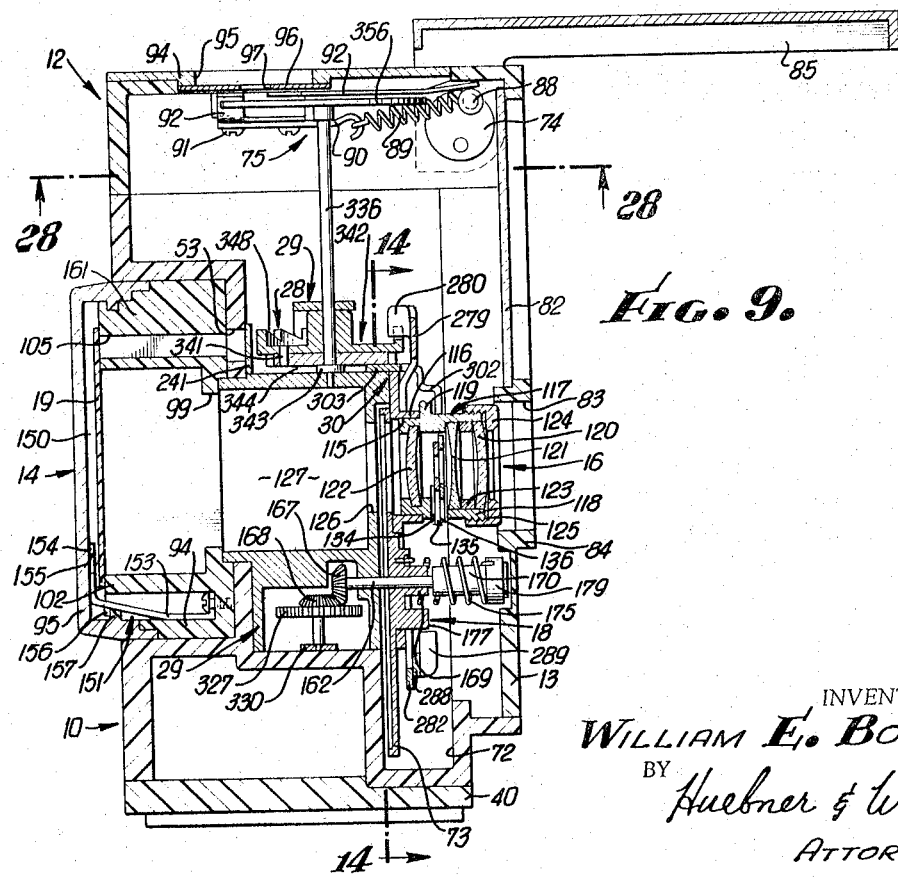
FIGURE 9 is a cross-sectional view taken on line 9—9 of FIGURE 7, and illustrating the relationship of the lens unit and film magazine.

The case 10 also includes a well 72 that accommodates the shutter blade 73 of the shutter assembly 18, FIGURES 7 and 9.

The housing 12 is substantially centrally mounted on the upper side of the case 10. The front panel 13 is vertical to and depends from the housing 12.

The front panel 13 is attached to the front of the case 10 by fasteners 80. The front lens 81 of the viewfinder is mounted in the panel 13 in linear alignment with the rear lens 71. Also the front panel 13 contains a lens 82, that may be either a fresnel or a pebble lens, which is a component of the source of light 23, FIGURE 5, serving to suitably orient the light output from light source 23 for proper illumination of the subject to be photographed.

A lens opening 83 is substantially centrally located in panel 13. Integral with the panel 13 is a flange 84 that in effect provides a shield for the lens of the lens unit 16. In the event the panel 13 is caused to strike an object, or vice versa, the flange 84 will absorb the force of the impact; except when the object is so small as to be able to pass through the opening 83.

A dust cover 85, having a pair of spaced apart ears 86 integral therewith, is pivotally attached to housing 12. The dust cover 85 pivots from the closed and protecting position over the opening 83 and hence the lens of the lens unit 16, illustrated particularly in FIGURES 1 and 29, to the open position illustrated particularly in FIGURES 3, 5 and 9, to expose the lens of the lens unit 16 for the purpose of taking photographs. The pivotal attachment of dust cover 85 to the housing 12 is accomplished by affixing a disc 74 to the inner surface of each of the ears 86, as by screws 87, the discs being pivotal in respective circular apertures in the side walls of housing 12.

Referring now particularly to FIGURES 7, 9, 28 and 29, located within the housing 12 is a master switch 75 that includes one of the discs 74 which rotates with the dust cover 85 as the dust cover 85 is opened and closed. Secured to this disc 74, adjacent the periphery thereof, is a pin 88. A silver coated spring 89 is hooked to the pin 88 and to an L-shaped electrical conductor strip 90. Screws 91 secure the conductor strip 90 and insulation block 90a to the housing 12. A Z-shaped electrical conductor strip 92 is adjacent conductor strip 90 and it too is secured to the housing 12 by a screw 93, FIGURES 7, 9, 28 and 29.

Figure 29:
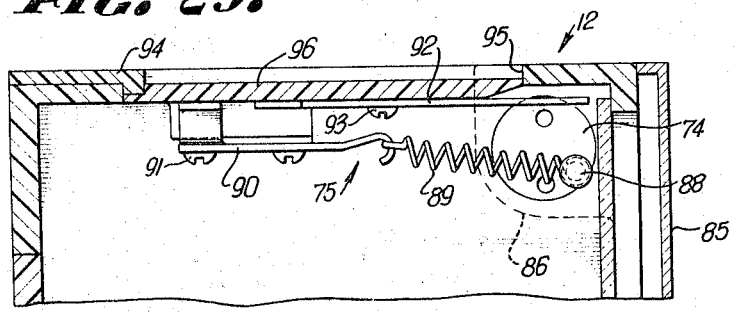
FIGURE 29 is a cross-sectional view taken on line 29—29 of FIGURE 28.

When the dust cover 85 is closed, FIGURE 29, the pin 88, which is an electrical contact, does not engage the conductor strip 92 and therefore no current is capable of flowing between these two points. Also, it is worth noting, that the spring 89 is in an over center position and therefore the dust cover 85 is biased to the closed position.

When the dust cover is open, as best seen in FIGURE 9, the pin 88 engages conductor strip 92 to close an electrical circuit and current is then capable of passing from conductor strip 92 to conductor strip 90. With the dust cover 85 up or open the spring 89 is in an over center position wherein the spring 89 biases the dust cover to the open position.

A plate 94 is mounted on the housing 12, forming the top wall of housing 12, and in the plate 94 is an opening 95. A masking disc 96 is fastened to plate 94 so as to extend across opening 95, the disc 96 having a small aperture 97 therein which functions as a window, through which a number may be seen which corresponds to the film frame in position for exposure, FIGURES 1 and 9.

*Film magazine 14*

The film magazine 14 may best be seen, in whole or in part, in FIGURES 1–3, 6, 9, 11, 13 and 24.

The film magazine 14 includes a body 94 and a cover 95. The body portion 94 of the film magazine is received in the recess 50 formed in the case 10.

Opposed sides of the cover 95 have notches 96 and 97 respectively therein. Notch 96 receives the latching projection 65 and notch 97 receives the free end 56 of clip 54 in the manner illustrated in FIGURE 24, to removably lock the film magazine 14 to the camera case 10 in the manner previously described in the section devoted to the camera case 10.

One wall 98 of magazine body 94 has an opening 99 therein that registers with opening 51 in the camera case 10. The openings 99 and 51 are in communication with light chamber 127.

Integral with the wall 98 extending toward the cover 95, and spaced from the opening 99, is a relatively thick top wall 101, FIGURE 9, a bottom wall 102, FIGURE 9, and a pair of internal side walls 103 and 104, FIGURE 24. The top wall 101 has a tunnel-like opening 105 therein that is closed at one end thereof except for a pair of narrow, spaced openings 106, FIGURE 11. The tunnel 105 and spaced openings 106 are in registry with the opening 53 in case 10. The top, bottom and side walls 101, 102 and 103 and 104 respectively, further define a light chamber 107 that is in alignment with light chamber 127. Side wall 103, in cooperation with the body 94 and cover 95, defines a compartment 108 in which is located a rotatably mounted idler spool 109 having a central shaft 110. Side wall 104 in cooperation with the body 94 and cover 95 defines a compartment 111 in which is located a rotatably mounted, gear driven spool 112 having a central shaft 113. The side walls 103 and 104 have respective elongated recesses 78 and 79 therein, which provide on the side walls a pair of spaced projections that are engaged by the edges of the film 19 as it is advanced. This two point contact reduces the likelihood of scratching the film, and provides a very flat frame of the film between the side walls 103 and 104.

Shaft 113 has a gear 332 secured thereto that meshes with gear 298 of the driving means 26 which will hereinafter be more fully described.

The cover 95 is enlarged intermediate its sides and ends as at 150. This enlarged area, in cooperation with the sides 103 and 104, provides a relatively narrow passage through which the film 19 is advanced from spool 109 to spool 112, as a further assurance that the film will not curl or otherwise distort out of shape.

The body 94 and cover 95 are releasably locked in an assembled condition by an L-shaped spring lock 151, FIGURE 9. One leg 153 of the lock 151 is fastened to the body 94. The other leg 154 has an opening 155 therein into which a special tool may be inserted for disassembly. Leg 153 has a latch projection 156 thereon that engages a projection 157 on the cover 95.

The film magazine 14 is substantially tamper proof, i.e., once the film magazine 14 is loaded with film 19 and the cover 95 is applied to the body 94 the lock 151 prevents tampering with the film 19 unless a special tool is available to insert into the opening 155 to pull the leg 153 toward the body 94 to disengage latch projection 156 from projection 157 to release the cover 95 from the body. Once the cover 95 is removed from the body 94 an exposed roll of film may be removed and an unexposed roll of film may be inserted into the magazine 14. A tab of the film is applied to spool 112. The driving means 26 then advances the lead-in portion of the film 19 in a manner to be hereinafter described in greater detail.

If desired, the lock 151 may be composed of magnetic material and may be so shaped and situated in the film magazine 14 that it can only be released by properly positioning a magnet adjacent the outside of the magazine.

Figure 11:
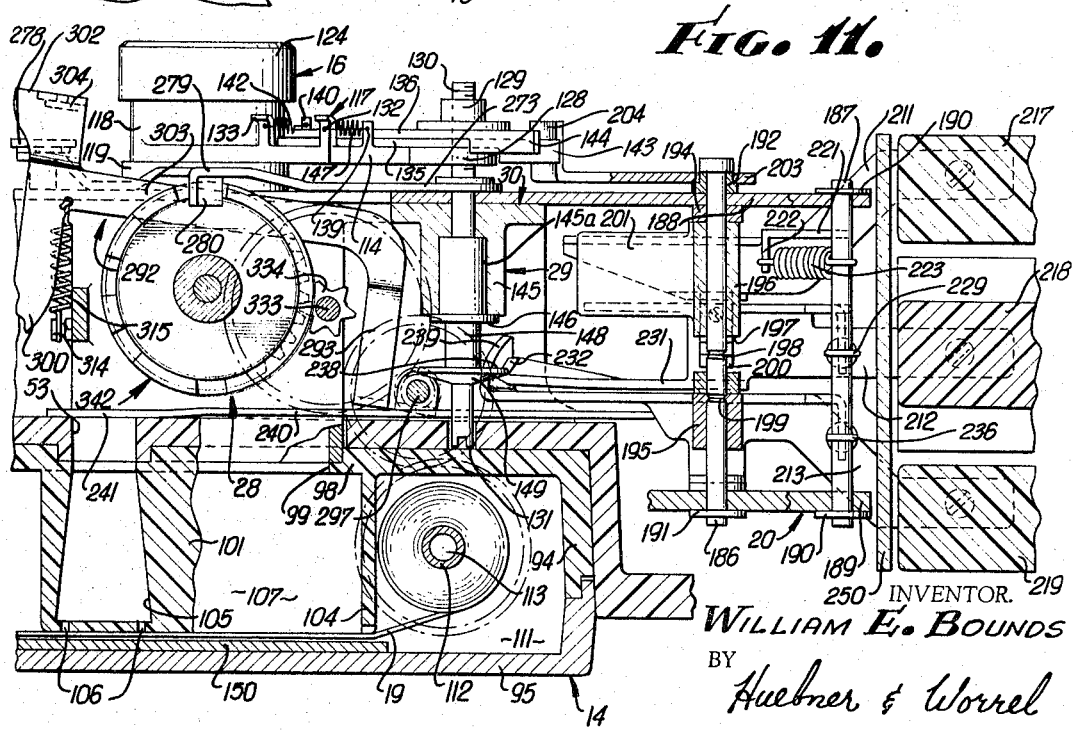
FIGURE 11 is a fragmentary cross-sectional view taken on irregular line 11—11 of FIGURE 10.

When the film 19 is advanced from spool 109, across the light chamber 107 and onto spool 112, one edge of the film passes before the openings 106, FIGURE 11. When the light source 23 is energized, light passing through opening 53, tunnel 105 and openings 106 strikes the light sensitive film 19 and causes a pair of index marks to be printed on each exposed frame of the film. These index marks permit accurate manual or automatic positioning of each frame of the film when it is processed.

*Lens unit 16*

The various components that are included in the lens unit 16 may best be seen by referring to FIGURES 5-11, 13, 17 and 18.

Referring particularly to FIGURE 9, the supporting plate 30 has an opening 115 therein which is defined by an annular flange or sleeve 116.

A photographic lens, broadly designated 117, includes a lens barrel or tube 118 that is inserted within the sleeve 116. An annular stop shoulder 119 on the barrel 118, intermediate the ends thereof, abuts against the sleeve 116 and limits the depth of insertion of the barrel within the sleeve.

A plurality of lenses 120, 121 and 122 are disposed within the tube 115 in spaced relationship.

A ring spacer 123 is between lenses 120 and 121 and a ring cap 124 is threaded onto the free end of the barrel 115 to retain the lenses captive within the barrel. A gasket 125 is between the end of the barrel 115 and the ring cap 124.

The axis of the opening 83 in the front panel 13, and the axis of the opening 115 in the plate 30, coincide with the axis of the photographic lens 117. The photographic lens 117 is recessed within the case 10 behind the opening 83 in the front panel 13.

The body 29 has an opening 126 therein that is in alignment with and is spaced from the opening 115 in the plate 30. The axis of the opening 126 also coincides with the axis of the photographic lens 117.

The opening 126 is in communication with a substantially square light chamber 127 that is a part of the body 29. The walls of the light chamber 127 project through the opening 51 in the case 10; and by this means the body 29 is supported by the case 10, FIGURE 9.

Therefore, it may best be seen in FIGURE 9 that when the dust cover 85 is in the open position, whenever the shutter blade 73 is in an open position, light will pass through the opening 83, lenses 120, 121 and 122, through openings 115 and 126 into light chamber 127, and from the light chamber 127 light will pass into the film magazine 14 and strike the light-sensitive film 19 thus producing a photograph.

Figure 13:
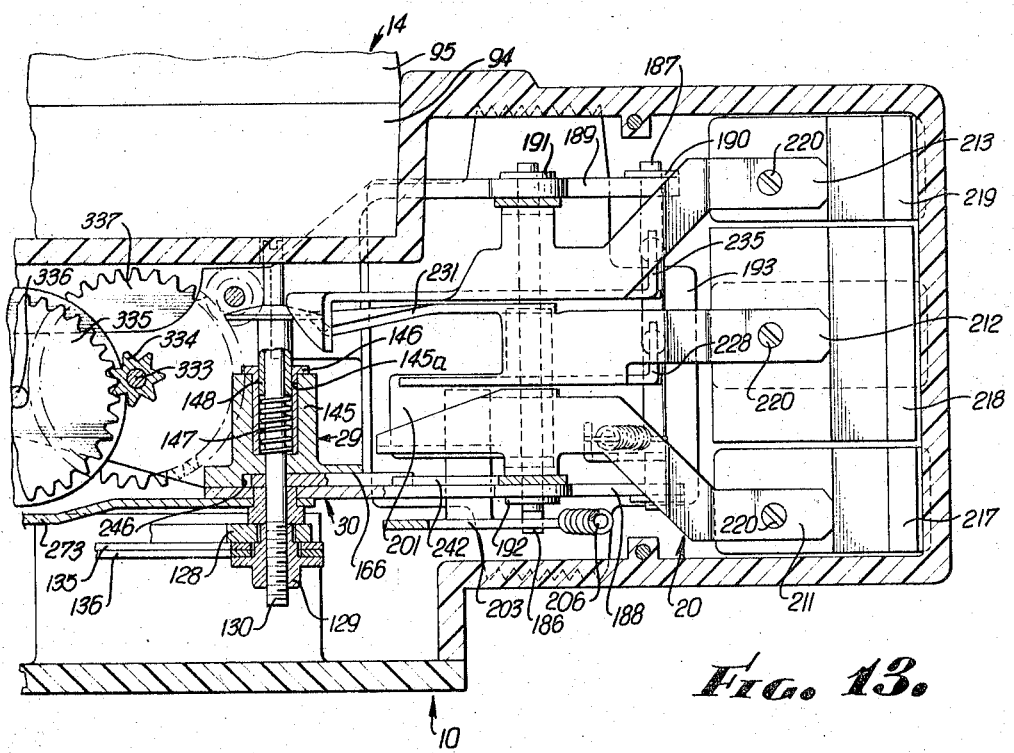
FIGURE 13 is a fragmentary cross-sectional view taken on irregular line 13—13 of FIGURE 10, certain parts being broken away to illustrate details of construction.

Referring now to FIGURES 7, 11 and 13, the photographic lens barrel 118 has a substantially rectangular shaped bracket 114 thereon, and on the bracket is an extension 128. The extension 128 is firmly attached to and supported by a bushing 129, and the bushing is in turn threaded onto a shaft 130. The shaft 130 is in turn slidably supported by the plate 30 and the body 29, one end of the shaft 130 extending into an opening 131 in the case 10. A pair of spaced projections 132 and 133 are on the bracket 114.

As shown in FIGURE 9, the lens barrel 118 has a relatively narrow slot 134 therein, between lenses 121 and 122 which receives one end of elongated blades 135 and 136.

Each blade 135 and 136 is pivotally supported, intermediate the ends thereof, on the bushing 129. Further, the blades 135 and 136 have respective circular openings 137 and 138 therein. Each blade has a projection 139 and 140 thereon. A spring 141 is connected to projection 132 on bracket 114, and projection 139 on blade 135. Also, a spring 142 is connected to projection 133 on bracket 114 and projection 140 on blade 136. The springs 141 and 142 bias the respective blades 135 and 136 to the position whereby the openings 137 and 138 are concentric with the aperture of the photographic lens 117. The opening 137 in blade 135 is larger than the opening 138 in blade 136. Therefore, the blades may be actuated by the linkage system 20 either collectively or individually to alter the aperture of the photographic lens 117 from a relatively small aperture governed by the opening 138, to a relatively large aperture where both blades 135 and 136 are removed from the slot 134.

Figure 17:
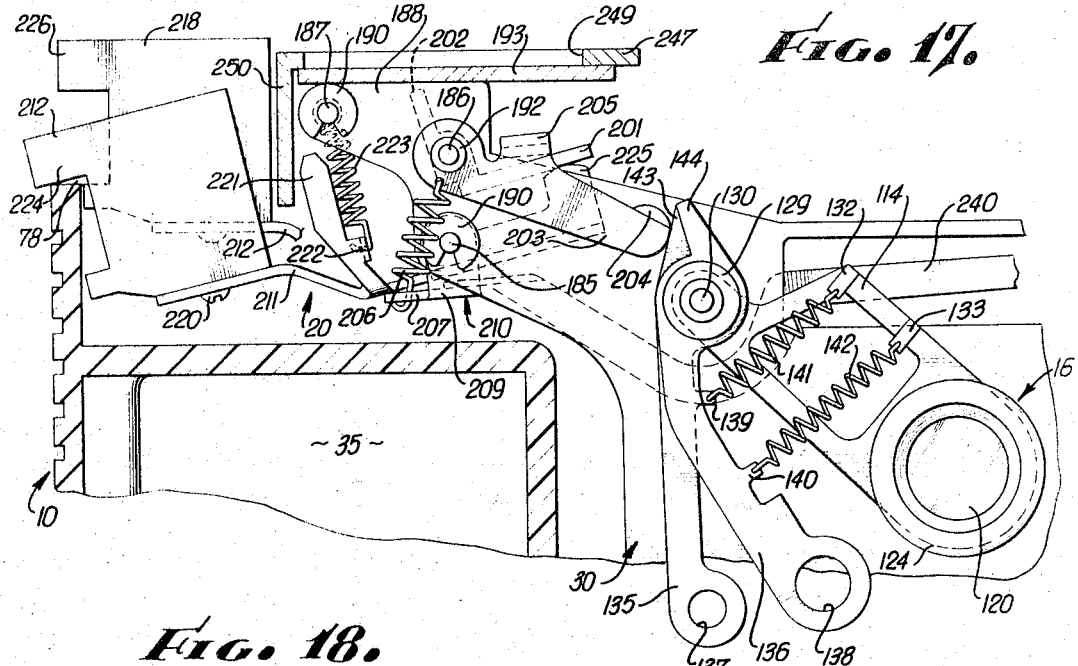
FIGURE 17 is an enlarged operational view illustrating the actuation of apertured blades by the manually operated linkage system.
Figure 18:
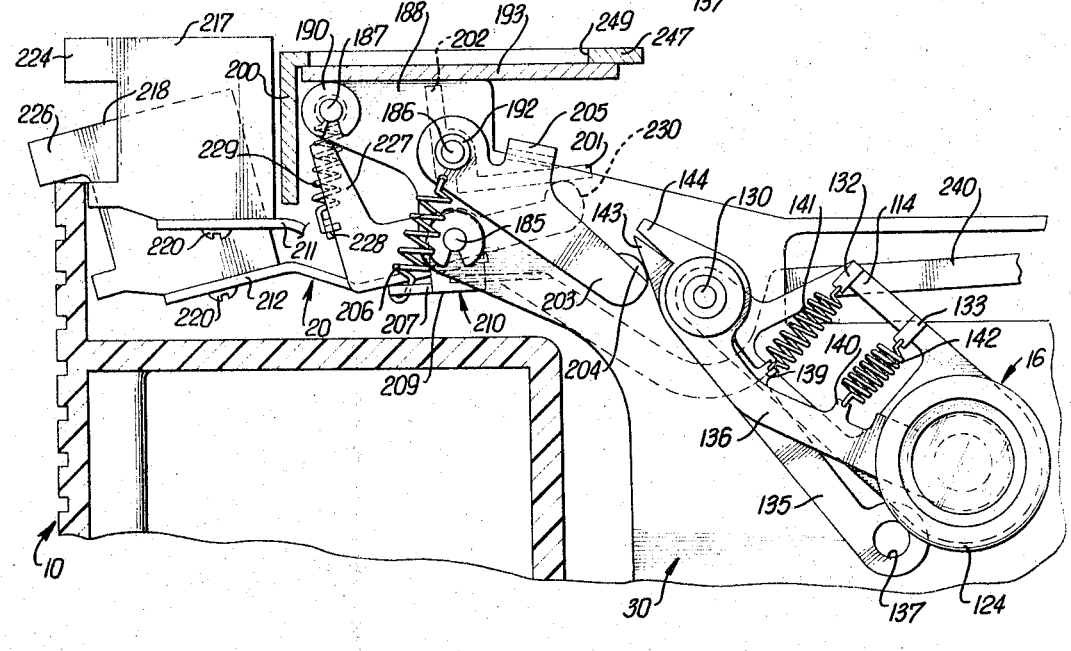
FIGURE 18 is an operational view similar to FIGURE 17, but illustrating the actuation of a single apertured blade by the manually operated linkage system.

A finger 143 is on blade 136 adjacent the axis of pivot, shaft 130, and a finger 144 is on blade 135 adjacent the axis of pivot, shaft 130. Finger 143 on blade 136 is engaged by the manually operable linkage system 20, causing blade 136 to pivot about the bushing 129, which results in the blade 136 in the region of opening 137 being removed from the superimposed position with respect to the photographic lens 117, as shown in FIGURE 18. Further actuation of linkage system 20 causes finger 143 to engage finger 144 so as to pivot blade 135, as illustrated in FIGURE 17, thus removing the blade 135 in the region of opening 137 from the superimposed position with respect to the lens 117.

Provision is also made for focusing the lens unit 16 which may best be seen by referring to FIGURES 11 and 13. The body 29 has a boss 145 integral therewith. A cylindrical opening 145a is in the boss 145 and inserted in the opening is a flanged bushing 146. Disposed within the bushing is a spring 147 that seats on the bottom of the opening. A cylindrical collar 148 is firmly secured to the shaft 130, bearing against the spring 147, and it is slidable within the bushing 146. Integral with the collar 148 is a cone-shaped cam member 149 that is engaged by the manually operable linkage system 20.

When force, through the manually operable linkage system 20, is applied to the cam member 149 the shaft 130 is urged from the position illustrated in FIGURES 11 and 13 toward the picture subject. Since the bracket 114 is fixedly attached to the shaft 130 and the bracket 114 is in turn integral with the lens barrel 118, the photographic lens 117 is moved forwardly relative to the camera case 10 to an extended position which results in altering the focus of the photographic lens 117. First the blade 136, and then both of the blades 136 and 135 are moved synchronously with the photographic lens 117. Therefore, the entire lens unit 16 is influenced by the movement of the shaft 130. The spring 147 normally biases the lens unit 16 to the retracted or rearwardmost position illustrated in FIGURES 11 and 13.

*Shutter assembly 18*

The shutter assembly 18 may best be seen in whole or in part in FIGURES 7–10, 12, 14, 19–23, 30 and 31.

The shutter assembly 18 includes a flat, circular shutter blade 73 that rotates about an axis defined by shaft 162, FIGURE 9. Although the shaft 162 supports the rotatable shutter blade 73, the latter is not directly influenced by the rotation of the shaft. The shutter blade 73 is free to rotate in the space between the opening 115 in plate 30 and opening 126 in body 29, FIGURE 9, and projects down into the well 72 in the case 10. There is a film exposure opening 163 in the shutter blade 73 adjacent to the peripheral edge of blade 73; and there is a peripheral enlargement on one side of the shutter blade which results in providing a shoulder 164, FIGURE 14. This shoulder 164 is engaged by a finger 165 of an L-shaped pawl 166 that is a component of the manually operated linkage system 20, FIGURE 14, movement of the pawl 165 out from behind the shoulder 164 releasing the shutter blade 73 for exposing a frame of the film, and for setting off the automatic sequence of operation hereinafter described which actuates light source 23, and actuates the driving means 26 and metering structure 28 for winding the film and reloading and resetting the shutter blade 73.

Figures 30, 31:
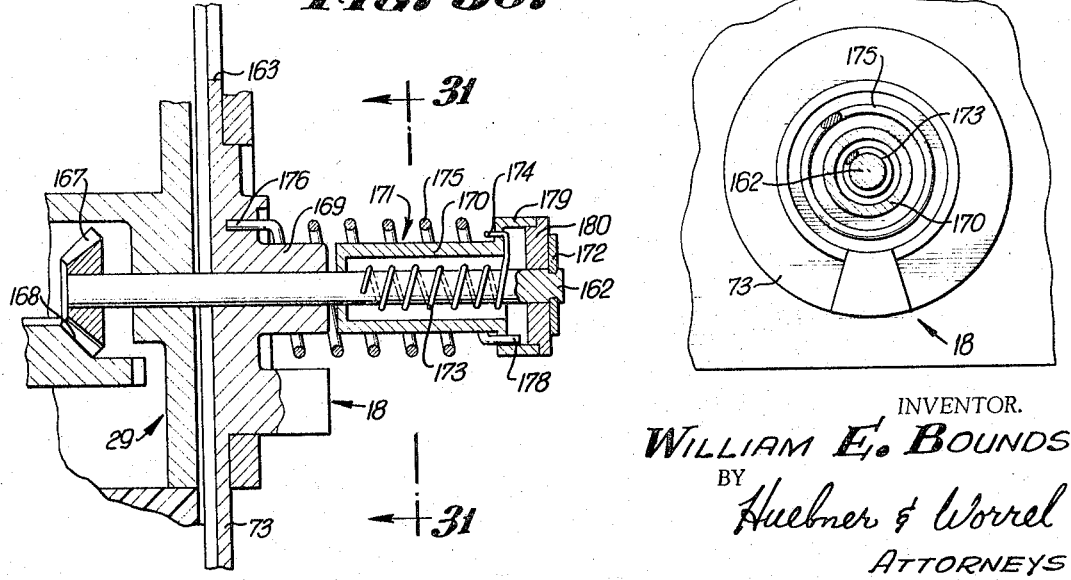
FIGURE 30 is an enlarged view in cross-section illustrating a clutch that is a component part of a shutter assembly.
FIGURE 31 is an enlarged view taken on line 31—31 of FIGURE 30.

FIGURE 30 shows a bevel gear 167 secured to shaft 162, gear 167 being engaged by another bevel gear 168 that is a component of the driving means 26.

The shaft 162 extends through a hub 169 that is integral with the shutter blade 73. Spaced from the hub 169 and rotatable about the shaft 162 is a cylindrical housing 170 of a slip clutch 171, housing 170 having an annular enlargement 179 and an end plate 180 at its forward end. The housing 170 is retained on the shaft 162 by a snap ring washer 172. Coiled about the shaft 162 in frictional engagement with shaft 162, and disposed within the housing 170, is a spring 173. One end 174 of the spring 173 extends through an opening in the housing 1, FIGURE 30. Coiled about the exterior of the housing 170 and hub 169 is a spring 175 that has a finger 176 thereon which extends into an opening in the shutter blade 73; on the other end of the spring 175 is another finger 178 that extends into an opening in the housing 170, FIGURE 30.

Th housing 170, springs 173 and 175, comprise the slip clutch 171 that rotates the shutter blade 73 in the following manner: The shaft 162 and spring 173 are rotated by the driving means 26 in a clockwise direction as the operation is viewed in FIGURE 31, which results in rotating housing 170 in the same direction. The shutter blade 73 is being held temporarily by pawl 166 and therefore is incapable of rotating at this time. Rotation of the housing 170 therefore results in winding up spring 175 to a desired tension, which, when accomplished, overrides the frictional engaging force of the spring 173 against the surface of shaft 162. The shaft 162 is thus caused to slip relative to housing 170. With the spring 175 fully loaded, release of the pawl 166 results in the shutter blade 73 rotating in a clockwise direction. The opening 163 is rotated into and past registry with the photographic lens 117, resulting in exposure of the light sensitive film 19. The shutter speed is controlled by the frictional engaging force of spring 173 about shaft 162, which in turn governs the amount of torsion developed in spring 175 when spring 175 is wound.

A cam 177, integral with the shutter blade 73, sequentially engages the first linkage system 22 and the second linkage system 24 so as to respectively sequentially trip off light source 23 and energize driving means 26.

*Manually operable linkage system 20*

The manually operable linkage system 20 may best be seen, in whole or in part, by referring to FIGURES 1–8 and 10–19.

The manually operable linkage system 20 includes three spaced shafts 185, 186 and 187, FIGURES 14, 15 and 16, that are supported by an arm 188 that is integral with the plate 30, and an arm 189 that is integral with the body 29. Snap ring washers 190 on each end of shafts 185 and 187 prevent the shafts from sliding out of the arms 188 and 189. Shaft 186 has a snap ring washer 191 on one end and a bushing 192 freely rotatable on the other end, FIGURES 15 and 16.

Figure 4:
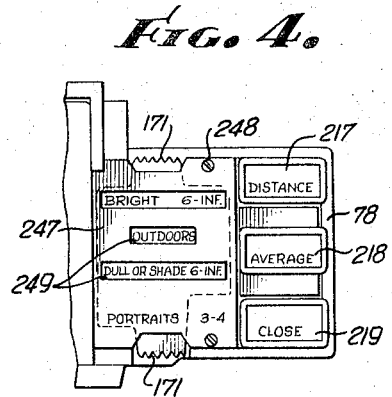
FIGURE 4 is a fragmentary top view, illustrating the top right side of the camera, as viewed in FIGURE 1, and showing that the operation of the camera is set for taking outdoor photographs.

A relatively flat and substantially rectangular plate 193 is supported by means of a pair of spaced ears 194 and 195, which are integral with plate 193 and are slidable back and forth on shaft 186 from the position illustrated in FIGURE 15 to the position illustrated in FIGURE 16 The plate 193 has a pair of opposed and serrated finger gripping edges 171 thereon, FIGURES 1 and 4. The serrated edges 171 project alternately through the notches 68 and 69 as the plate 193 is moved back and forth.

The upper surface of the plate 193 has indicia applied thereto which indicates whether the operation of the camera is set for taking indoor or outdoor photographs. For instance, with the plate 193 in one position, the indicia visible in FIGURE 1 indicates that the operation of the camera is set for taking indoor photographs, while with the plate set in another position the indicia visible in FIGURE 4 indicates that the operation of the camera is set for taking outdoor photographs. FIGURES 15 and 16 correspond to the settings indicated in FIGURES 1 and 4 respectively.

A cylindrical sleeve 196, FIGURES 14, 15 and 16, slidable on and pivotal about shaft 186, spans the distance between the ears 194 and 195. A notch 197 is cut in the sleeve 196 intermediate the end thereof, as shown in FIGURES 15 and 16, to expose a portion of what is normally the underside of the shaft 186. A pair of spaced, annular V-grooves 198 and 199 are formed in the shaft 186, FIGURES 15 and 16. A leaf spring detent 200 affixed to the underside of sleeve 195 engages one or the other of the grooves 198 and 199, as the plate 193 is moved back and forth on the shaft 196.

An elongated, generally flat plate 201, FIGURE 14, is integral with the sleeve 196 and extends from the bottom of sleeve 196 at right angles to the axis of the sleeve; and also integral with the sleeve 196 is an upwardly extending stop finger 202. The stop finger 202 abuts against the underside of the plate 193 to hold sleeve 196 against anticlockwise rotation in FIGURE 14 and to thus normally retain the plate 201 in the illustrated position in FIGURE 14.

Referring now particularly to FIGURES 7 and 11, one end of a relatively flat, elongated lever 203 is firmly affixed to the bushing 192 so that lever 203 pivots about shaft 186. The free end of the lever 203 is bent at right angles to provide a finger 204 that is in continuous engagement with the finger 143 of blade 136. Intermediate the ends of the lever 203 and extending at right angles thereto in a direction opposed to finger 204 is an arm 205, FIGURE 14. One end of a spring 206 is connected to the lever 203 between the axis of rotation, defined by the shaft 186, and the arm 205, FIGURE 7. The other end of the spring 206 is connected to a projection 207. The spring 206 urges the lever 203 to pivot clockwise as the structure is viewed in FIGURE 7, pivoting of lever 203 being limited by continuous bearing of the arm 205 against plate 201 as seen in FIGURE 14. As stated above, the plate 201 is limited against pivoting in this same direction by abutment of the stop finger 202 against plate 193.

Figure 12:
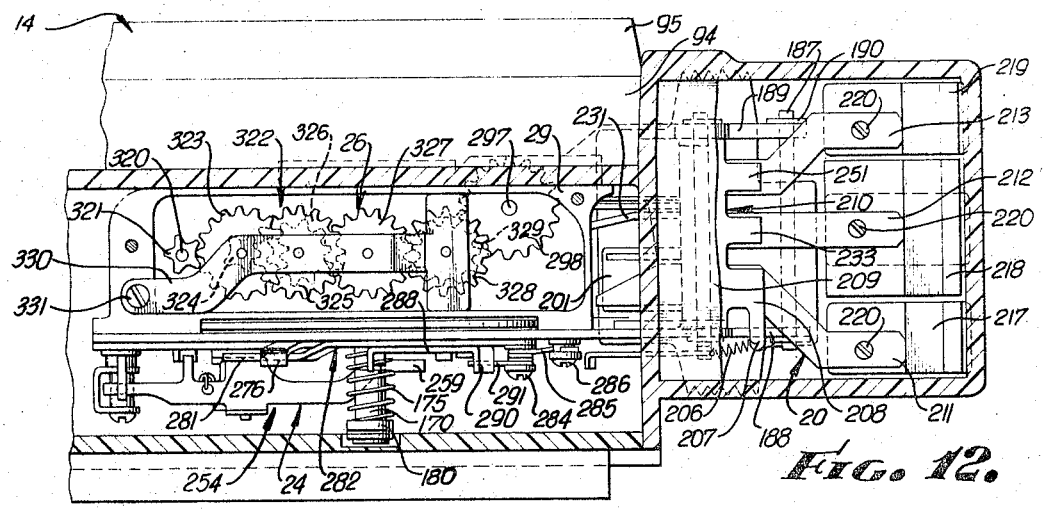
FIGURE 12 is a cross-sectional view taken on line 12—12 of FIGURE 8.

The projection 207, FIGURE 12, is an integral part of an extension 208 that is on the bight 209 of a generally U-shaped member 210, FIGURES 15 and 16. The U-shaped member 210 is supported by a pair of integral spaced legs 184 that freely pivot about shaft 185. However, the spring 206 biases the U-shaped member 210 to the position illustrated in FIGURES 15 and 16 which places the bight 209 substantially parallel with the plate 201. Pivoting of the U-shaped member 210 against the biasing force of spring 206 results in actuation of pawl 166 to shift the pawl out from behind the shoulder 164 on shutter blade 73, and also results in the opening of a light passage between the light source 23 and the edge of the film strip for indexing each frame of the film strip, in the manner described hereinafter in detail.

Each of the plurality of levers 211, 212 and 213 is supported by and has intermediate the ends thereof a pair of ears 214, 215 and 216 respectively, which freely pivot about shaft 185. A finger actuated button 217, 218 and 219 is secured by a fastener 220 to each lever 211, 212 and 213, respectively, FIGURE 12.

Consider now the first identified lever 211, which may be further identified in FIGURES 1, 4 and 6 as having the word "Distance" applied to its button 217. Lever 211 is generally Z-shaped as viewed in FIGURE 13. Between the button 217 and the ears 214, FIGURE 17, is an upstanding finger 221 that has a projection 222 thereon to which is attached one end of a spring 223. The other end of the spring 223 is hooked about shaft 187. The spring 223 biases the lever 211 to its uppermost or unactuated position, as illustrated in FIGURE 7. The free end of the finger 221 abuts against the shaft 187 when the lever 211 is in the aforementioned uppermost position of FIGURE 7. The shaft 187, therefore, functions as a stop to limit the movement of the lever 211 in one direction.

Button 217 has an extension 224 thereon which strikes against a stop 78 on the case 10 when the button is depressed, FIGURE 17. Accordingly it will be seen that the shaft 187 limits the movement of the lever 211 in one direction and the stop 78 limits the movement of the lever 211 in the other direction.

On the opposite end of lever 211 from the button 217 is a generally upstanding projection 225. The projection 225 is in continuous contacting engagement with the plate 201 when the latter has not been actuated by another lever. When the camera is set for indoor operation, depressing button 217 ultimately results in actuating both of the blades 135 and 136 to alter the aperture of the photographic lens 117 so that the lens 117 will have its largest aperture, in a manner as will hereinafter be more fully disclosed.

It is to be noted that actuation of the lever 211 does not affect the focus of the lens unit 16.

The extension 208 on the bight 209 of the U-shaped member 210 is engaged by the lever 211 when the button 217 is substantially fully depressed, which results in the U-shaped member 210 pivoting about its axis shaft 185, FIGURE 12, for releasing the spring-loaded shutter blade 73 and for marginal indexing of the frame of film being exposed.

Lever 212, which may be further identified in FIGURES 1, 4 and 6 as having the word "Average" applied to its respective button 218, is relatively straight, FIGURES 12 and 13. The button 218 also has an extension 226 thereon which strikes against the stop 78 to limit the movement of the lever 212 when the button 218 is depressed, FIGURE 18. Also, lever 212 has an upstanding finger 227 thereon and on this finger is a projection 228 to which one end of a spring 229 is attached. The other end of the spring 229 is in turn hooked over the shaft 187, and the lever 212 is thus biased by the spring 229 to its unactuated position illustrated in FIGURE 17. The lever 212 has also an upwardly directed projection 230 thereon which is shorter than the corresponding projection 225 on lever 211. The projection 230 is normally spaced from the plate 201, but when the button 218 is depressed, as in FIGURE 18, the projection 230 engages and pivots the plate 201, and ultimately this actuation of the plate 201 results in actuating the blade 136 in a manner as will hereinafter be more fully disclosed so as to alter the aperture of lens 117 so that lens 117 will have an aperture of intermediate size.

Lever 212 has an extension 231 thereon, FIGURE 13, which has a twist therein, the free end of the extension 231 being formed into a knife edge cam 232 that engages the conical cam member 149 so as to shift the shaft 130 and the lens unit 16 forwardly in the case to establish the focus of the latter at an intermediate range focal position.

Therefore, actuation of lever 212 establishes the aperture and focus of the photographic lens 117 in order that picture subjects located at an average distance may be photographed indoors as well as outdoors.

Lever 212 also engages an extension 233 on the bight 209 to actuate the U-shaped member 210, pivoting the U-shaped member about its axis, shaft 185, FIGURE 12, for releasing the spring-loaded shutter blade 73 and for marginally indexing the film.

The lever 213 is also formed into a generally Z-shaped configuration that may be considered the reverse of lever 211, FIGURE 13.

Figure 10:
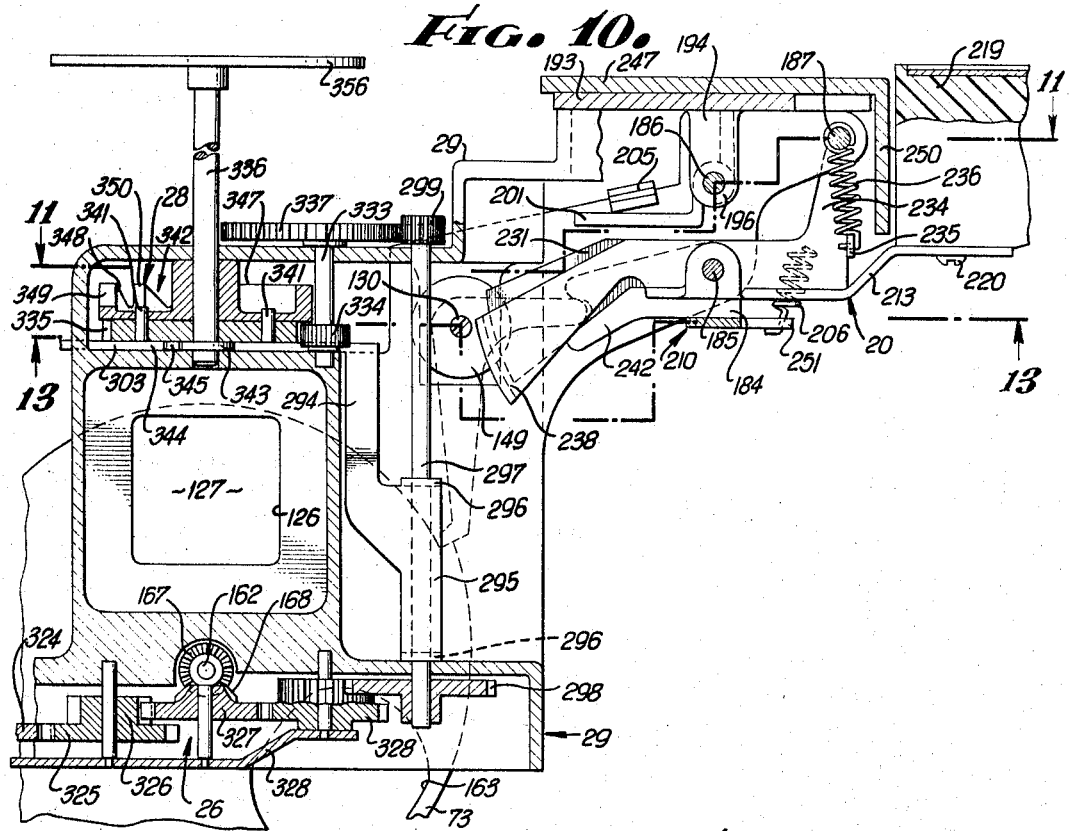
FIGURE 10 is an enlarged cross-sectional view, similar to FIGURE 8 but illustrating certain structure in greater detail.

An upstanding finger 234, FIGURE 10, similar to fingers 221 and 227 is integral with the lever 213. Finger 234 has a projection 235 integral therewith and connected between the projection 235 and the shaft 187 is a spring 236 that biases the lever 213 to its unactuated position illustrated in FIGURE 10. The free end of the finger 234 abuts against the shaft 187 to limit the movement of the lever 213 in one direction. The button 219 connected to lever 213 also has an extension 237, FIGURE 8, integral therewith that strikes against stop 78 which limits the movement of the lever 213 in the other direction.

The end of the lever 213 opposite to the button 219 is bent at substantially right angles into a cam projection 238, FIGURE 11. One edge 239 of the cam projection is arcuately formed and engages the conical cam member 149 of the lens unit 16, to establish the focus of the latter.

The cam projection 238 on lever 213 imposes a more pronounced movement of the lens unit 16 than does the knife edge cam 232 on lever 212, establishing the focus of lens unit 16 at a close range focal position.

The button 219 on lever 213 carries the indicia "Close" which, in the present instance, indicates that the aperture of the lens is not altered, but the focusing of the lens is altered a maximum amount, as compared with a smaller focal adjustment when lever 212 is actuated, and no focal adjustment when lever 211 is actuated.

The lever 213 also engages an extension 251, FIGURE 12, that is integral with the bight 209 of the U-shaped member 210 to cause the latter to pivot about shaft 185, for indexing the film.

An elongated substantially flat lever 240, FIGURE 11, is secured to the bight 209, FIGURES 15 and 16. The free end of lever 240 functions as a shield or shutter 241, FIGURE 9. The shield is superimposed over the opening 53 in the case 10 between the opening and the light source 23. Each time one of the levers 212, 213 or 214 is actuated for taking a picture, one of the extensions 208, 233 or 251 on the bight 185 is engaged, which causes pivoting of the U-shaped member 210 about the shaft 185. Pivoting of U-shaped member 210 causes release of the spring-loaded shutter blade 73 in the manner described immediately below, and actuates lever 240 to remove the shield 241 from between the opening 53 and the source of light 23, so as to provide a small exposure mark on the edge of each frame of the film, thus indexing each exposed frame of the film for convenience in processing.

As shown in FIGURE 19, one leg 184 of the U-shaped member 210 has an extension 242 thereon. The free end of the extension 242 has an arcuate notch 243 therein that receives an arcuate end 244 of the L-shaped pawl 166. The pawl 166 pivots about a shaft 130 that is mounted in the body 29, and the body is channeled out at 246 to accommodate the pawl 166. By this means, when the U-shaped member 210 is pivoted in an anticlockwise direction in FIGURE 19 about shaft 185, it will cause pawl 166 to pivot in a clockwise direction so as to release the shutter blade 73.

Overlying the plate 193 is another plate 247. Screws 248 secure the plate 247 to the camera case 10, FIGURES 1 and 4. A plurality of notches 249 are in the plate 247 and through the notches may be seen the indicia that is on the plate 193 as the latter is shifted back and forth. Depending from plate 247, between the buttons 217, 218 and 219 and one edge of the plate 193, is a divider 250, FIGURE 7.

*First linkage system 22*

The first linkage system 22 may best be seen, in whole or in part, by referring to FIGURES 7 and 19–23.

When the shutter blade 73 is actuated by the release of pawl 166, the cam 177, which is integral with shutter blade 73, first engages the first linkage system 22 which includes an elongated lever 254, FIGURE 19. The lever 254 is supported, intermediate the ends thereof, by a projection 255 that is mounted on and freely pivots about a pin 256. The pin 256 is an integral component of a generally triangular-shaped body 257 which is secured to the plate 30, the body 257 preferably being composed of electrical insulation material, such as a suitable plastic. A snap ring fastener 258 retains the projection 255 on the pin 256.

One end 259 of the lever 254 is in the path of rotation of the cam 177. When the cam 177 strikes end 259 to force it up, the opposite end 260 of the lever 254 is forced down. An electrical contact 261 on end 260 engages a contact 262 that is rigidly mounted on the body 257. Engagement of the contacts 261 and 262 closes an electrical circuit which results in momentarily energizing the source of light 23 to illuminate the picture subject.

One end of a spring 263 is attached to the lever 254 between the projection 255 and end 260. The other end of the spring 263 is attached to an elongated lever 264 intermediate the ends thereof. One end of the lever 264 is pivotally secured to the body 257 by a screw 265 or other suitable fastener which also retains contact 262 firmly secured to the same body 257. Lever 264 is to be considered a component of the second linkage system 24.

The lever 254 is biased by the spring 263 to a position where the contacts 261 and 262 are normally open, but this spring biasing of lever 254 is limited by a stop 266, on the body 257, that is engaged by the lever 254.

*Second linkage system 24*

FIGURES 6–12 and 19–27 best illustrate the second linkage system 24.

Following the actuation of the first linkage system 22, and hence the light source 23, by the cam 177, the cam 177 engages a relatively flat surface 272, FIGURE 20, on a multipurpose, irregulaly shaped but generally curved lever 273, shifting the lever 273 so as to cause electrical contacts to engage for energizing the driving means 26. The exposure opening 163 has, at this time, already passed the position in which it admits light to expose the film. The cam 177 will then hang up on a projection 313 on lever 273 at the lower end of the flat surface 272.

One end 274 of the lever 273 is connected to and pivots about shaft 130 on body 29. The opposite end 275 of the lever 273 is formed into a hook 276. Intermediate the ends of the lever 273 is a projection 277 that has an electrical contact 278 thereon, this being one of the contacts which engage for energizing the driving means. Between the projection 277 and the end 274 is an arcuately shaped projection 279. The free end of the projection 279 is bent at right angles to the generally flat body of the lever 273, FIGURES 24 and 25, to provide a cam follower 280 which cooperates with the metering structure 28 as will hereinafter be more fully described. The previously mentioned surface 272 and projection 213 are between the projection 277 and the hooked end 276.

The hooked end 276 of lever 273 receives one end 281 of a generally C-shaped lever 282. The end 283 of the lever 282 opposite end 281 is supported by and pivots about a screw 284 that is threaded into plate 30.

One end of a spring 285 is engaged about a screw 286 which is threadedly attached to plate 30, the spring 285 being coiled about the screw 284 as seen in FIGURES 7 and 19–23. The spring 285 includes a free end 291 which projects outwardly from the screw 284.

A pin 287 pivotally supports one end of a lever 288 which is mounted on lever 282 intermediate the ends thereof. The free end of the lever 288 comprises an upstanding stop projection 289 which is engaged by the cam 177 during its period of rotation.

A finger 290 is on lever 288 and the location of this finger is between pivot pin 287 and screw 284.

The free end or extension 291 of the spring 285 bears down against the finger 290 and urges the lever 288 to pivot about its axis, pin 287, in an anticlockwise direction as viewed in FIGURES 7 and 19–23, which tends to urge projection 289 into the path of rotation of cam 177. The anticlockwise pivoting of lever 288 is limited by a projection 271 on lever 282, which overlies and is engaged by lever 288. Biasing force of the spring 285 on lever 288 is also applied through pin 287 to the lever 282, the spring 285 biasing the lever 282 in the opposite direction to that of lever 288; i.e., lever 282 is biased clockwise, or downwardly. The influence of the spring 285 is also imposed on lever 273 since the free end 281 of lever 282 is received by the hook 276 on lever 273, the downward force of the spring 285 imposed on lever 282 being transferred to lever 273.

After the shutter cam member 177 has been hung up for a short interval of time by the projection 313 on lever 273 during which time some winding of the shutter actuating spring 175 (FIGURE 30) occurs, continued actuation of the driving means 26 will cause the metering structure 28 to move the cam follower 280 on lever 273 upwardly, thus pivoting lever 273 anticlockwise in FIGURES 7 and 19–23 until cam 177 is released from projection 313. The shutter 73 then rotates clockwise until cam 177 hangs up on the stop projection 289, where it will remain, and the shutter actuating spring 175 will again be further wound, until the metering structure 28 permits cam follower 280 to drop so that lever 273 pivots anticlockwise, and electrical contact 278 on lever 273 is disengaged from a mating contact to stop the driving means 26. This anticlockwise pivoting of lever 273 drops lever 282 and hence lever 288 and its stop projection 289 sufficiently after each film frame except the last one to release shutter cam member 277 and permit shutter 73 to rotate clockwise back to its initial position in which pawl 166 engages the shoulder 164 on the shutter. However, after exposure of the last film frame, the cam follower 280 is dropped by the metering structure 28 only sufficiently to shut off the driving means 26, but not sufficiently to lower stop projection 289 out of the way of the shutter cam member 177, whereby the shutter will be locked up in an inoperative position.

Included in the second linkage system 24 is a lever 292 that appears, in FIGURES 24 and 25, to be generally U-shaped. However, one leg 293 thereof is bent downwardly, FIGURE 10, at substantially right angles thereto to provide a portion 294 which has an offset, elongated extension 295 integral therewith. The upper and lower ends of the extension 295 each have an ear 296 thereon which is received by an elongated shaft 297. The lever 292 is supported by the ears 296 and pivots about the shaft 297. Each end of the shaft 297 is supported by the body 29 and on the lower end of the shaft is a gear 298, and on the upper end is a gear 299, FIGURE 10. The shaft 297 and the gears 298 and 299 thereon are considered components of the driving means 26, FIGURE 10.

The free end of the other leg 300 of the lever 292, FIGURES 24 and 25, extends through the opening 52 in the camera case 10 and has a right angle bend therein to provide a projection 301 which is engaged by the film magazine 14 when the latter is snapped into its operative position in the rear of the case. When the magazine 14 is attached to the case 10 the lever 292 is moved to the position illustrated in FIGURE 24. A spring 315 connected to the lever 292 and to a pin 314 attached to body 29, biases leg 300 to the position illustrated in FIGURE 25 when the film magazine is removed from the case 10.

A Z-shaped extension 302, FIGURES 26 and 27, is on the bight 303 of the U-shaped lever 292 and extends in a direction opposite to the leg 300. An electrical contact 304 is on the free end of the extension 302.

When the film magazine 14 is removed from the camera case 10, which relieves the bias on lever 292, the contact 304 engages the contact 278 to close an electrical circuit to energize the motor 27 of the driving means 26.

One edge 305 of the extension 302 is curved and functions as a cam. The upper, free end 306 of lever 264 functions as an electrical contact and is continuously biased against the cam edge 305 by spring 263 except when lever 292 is actuated by attachment of the film magazine 14 to the camera case 10, such actuation of the lever 292 resulting in the cam edge 305 sliding from under the free end 306, which, in turn results in the end 306 engaging the contact 278 and closing an electrical circuit to energize motor 27 of the driving means 26.

Figure 22:
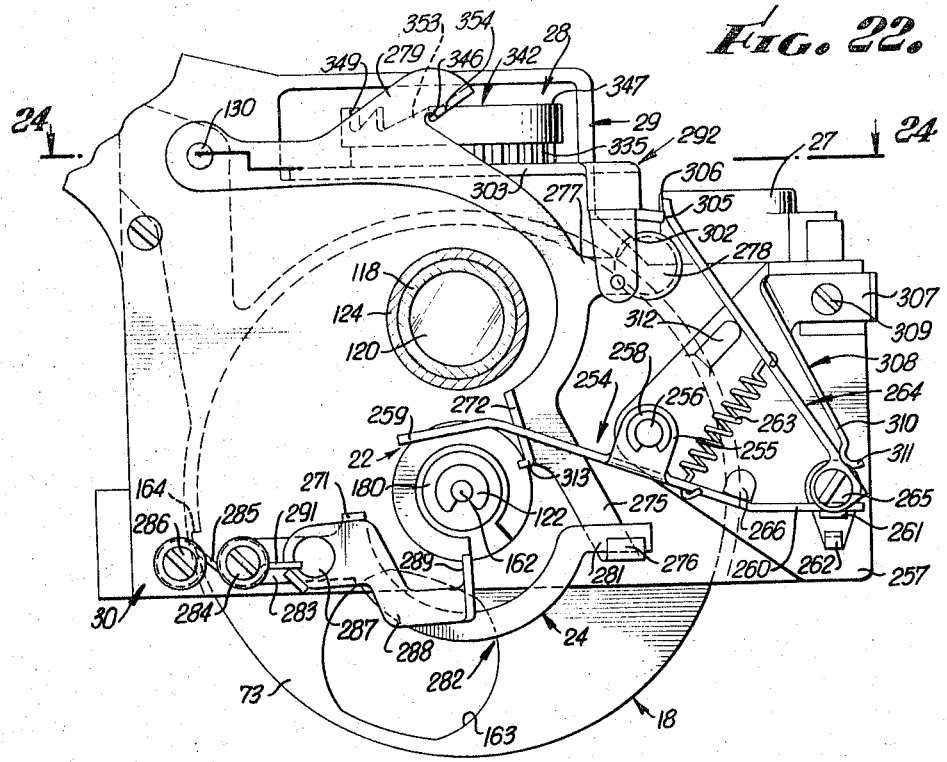
FIGURE 22 is an operational view similar to FIGURE 21, but illustrating the relationship of the linkage system and the cam on the shutter assembly to the structure for metering the advancement of the film when the last frame of the film has been exposed.
Figure 23:
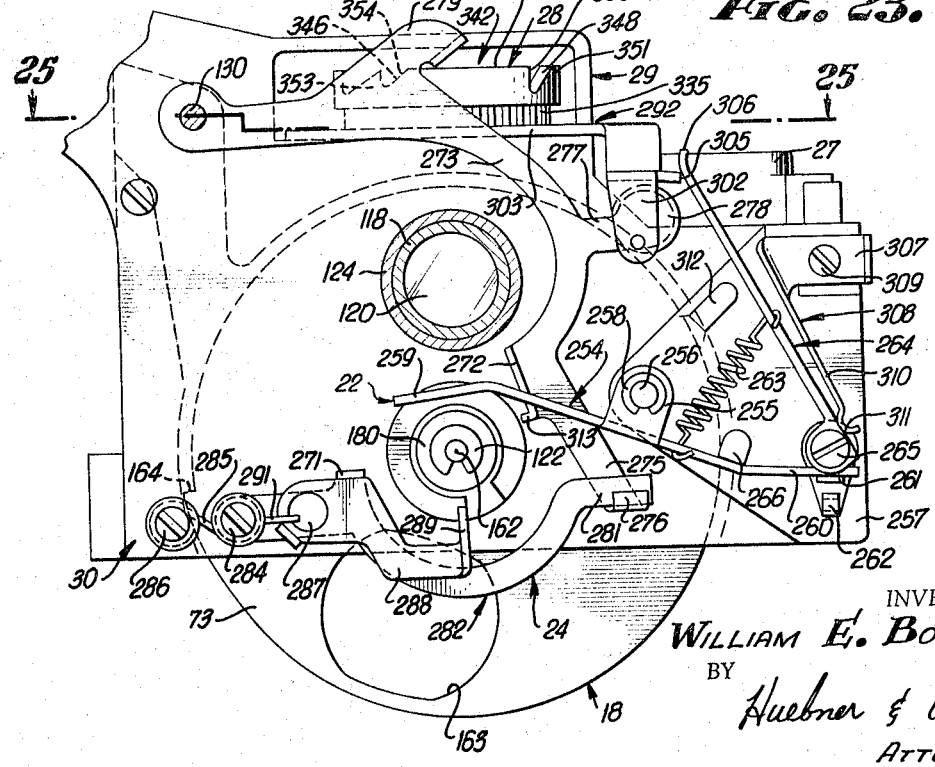
FIGURE 23 is an operational view similar to FIGURE 22, but illustrating the relationship of the linkage system to the film metering structure after the film magazine has been removed.
Figure 28:
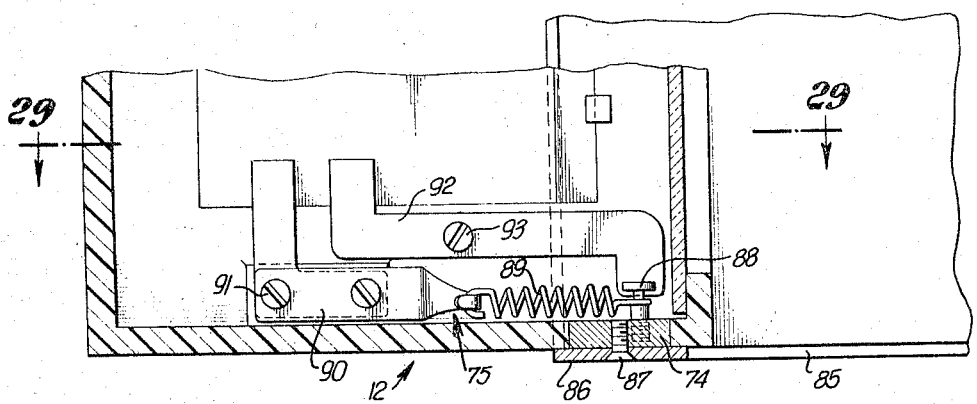
FIGURE 28 is a cross-sectional view taken on line 28—28 of FIGURE 9.

One leg 307 of an L-shaped electrical conductor 308, FIGURES 22 and 23, is fastened by a screw 309 to the plate 30. The other leg 310 of the conductor 308 has an arcuately shaped free end 311 that bears in continuous electrical contact against that end of the lever 264 adjacent its point of pivot represented by the screw 265.

The insulation body 257 has a stop 312 thereon which limits anti-clockwise movement of the lever 264 as it is viewed in FIGURE 7. The stop 312 functions to limit movement of lever 264 when the contact 278 on lever 273 is in the position illustrated in FIGURE 7.

*Driving means 26*

The best figures for illustrating the driving means, in whole or in part, are FIGURES 6, 8–13, 19–25, and 30.

Figure 8:
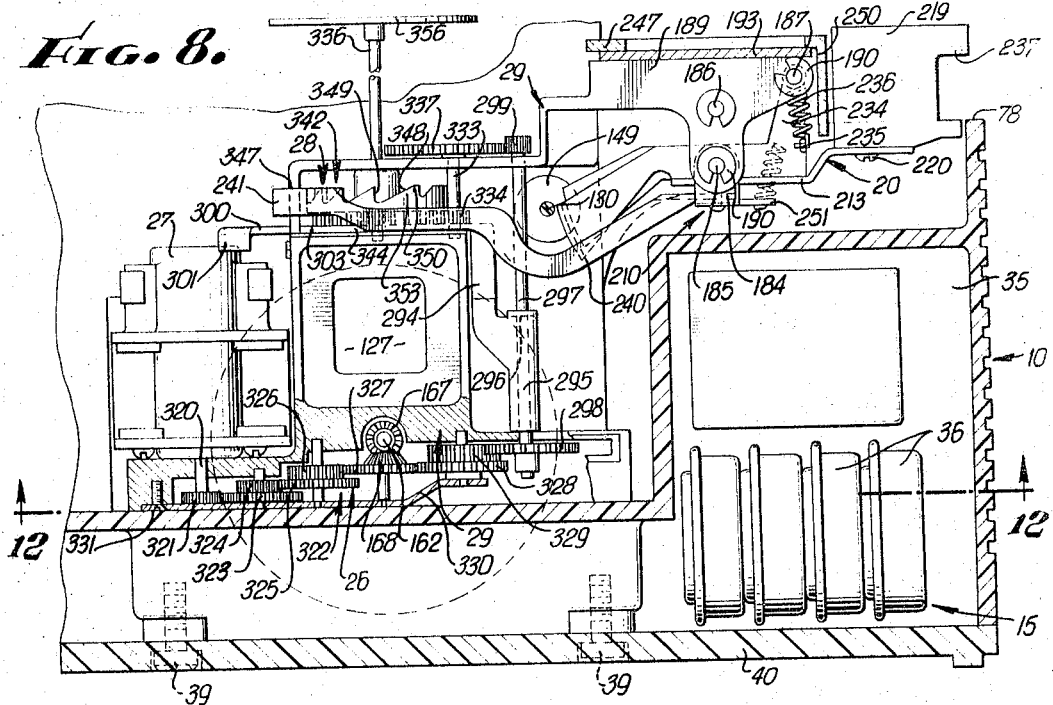
FIGURE 8 is an enlarged, fragmentary cross-sectional view taken on line 8—8 of FIGURE 1.

When an electrical circuit is closed, either by contact 304 engaging contact 278, or when the free end 306 of lever 264 engages contact 278, the motor 27 is energized, which rotates the motor shaft 320, FIGURE 8. On the end of the shaft 320 is the first gear 321 of a reduction gear train generally designated 322. Gear 321 meshes with an adjoining shaft-mounted gear 323. A gear 324 on gear 323 meshes with another shaft-mounted gear 325. On gear 325 is a gear 326 that meshes with a further gear 327. The bevel gear 168, which meshes with bevel gear 167, is integral with gear 327.

Gear 327 also meshes with an adjoining gear 328 which has a gear 329 thereon which in turn meshes with gear 298 mounted on the bottom of shaft 297.

A bar 330, fastened by screw 331 to body 29, spans the distance between gear 321 and gear 328. The bar 330, in cooperation with the body 29, supports one end of each shaft other than shaft 297 on which the gears are mounted, retains the gears in proper meshing relationship.

A driven gear 332, FIGURE 24, mounted in the film magazine 14, meshes with gear 298 when the magazine is attached to the camera case 10 and through this mechanical coupling the film 14 is advanced in the magazine.

A gear 337 mounted on a shaft 333 meshes with gear 299 mounted on the top of shaft 297. A gear 334, mounted on the opposite end of shaft 333 from gear 337, meshes with a gear 335 that is mounted on shaft 336. Also on shaft 336 is the film metering structure 28.

The motion of rotation is transferred from the motor shaft 320 through the identified gear train 322 to the bevel gear 167 for spring-loading the shutter blade 73 as heretofore described, and to gear 335 which causes the metering structure 28 to rotate. The motion of rotation is also transferred from the motor shaft 320 to gear 332 which advances the film 19 in the magazine 14 from the lead-in portion, through the advancement of each incremental frame of the film through the advancement of the tail-end portion.

*Metering structure 28*

The metering structure 28 may best be seen in whole or in part in FIGURES 6–11 and 19–25.

It has been stated that the gear 335 causes the metering structure 28 to rotate. This transference of motion is accomplished through pins 341, FIGURE 10, connecting the gear 335 to a cam disc broadly designated 342.

Shaft 336, which is supported in a vertical position by the body 29, rotates with the gear 335 and the cam disc 342, and has integral therewith a spacer 343 against which gear 335 abuts. The spacer 343 provides a space 344 between the gear 335 and the body 29 and extending into this space is a portion of the bight 303 of the U-shaped lever 292.

Forming an integral part of the spacer 343, and thus integral with the shaft 336, is a cam 345, FIGURES 24 and 25, that engages that portion of the bight 303 in the space 344 to urge the U-shaped lever 292 to the solid line position illustrated in FIGURE 25.

The cam disc 342 rotates clockwise as the operation is viewed looking down from the top of disc 342, as in FIGURES 6, 11, 24 and 25. The cam disc 342 is preferably, but not necessarily, divided into three successive zones that correspond to the three stages of advancing the film in the film magazine, i.e., the advancement of the lead-in portion, the advancement of the film from frame to frame, and the advancement of the tail-end portion, FIGURE 19.

The first zone is composed of a plurality of cam teeth which are not uniformly spaced apart. The second zone is between the first zone and the third zone, to be described, and is comprised of a valley or recess 346, FIGURE 23, that is shallower in depth than the valleys between the teeth of the first zone. The third zone is comprised of an elongated plateau 347 that is in substantially the same plane as the crest or crown of the teeth in the first zone.

Returning to the first zone of the cam disc 342, FIGURE 19, it is to be seen that this zone is comprised of a plurality of teeth each having an inclined front edge 348 and a substantially vertical back edge 349. The inclined front edge 348 and vertical back edge 349 define a tooth having a relatively, although not necessarily, pointed crest or crown 350. The vertical distance or drop from the crown of each tooth to the valley between each tooth, and from the plateau 347 to the valley immediately following the plateau 347, is uniform except for the shallower valley 346. However, the arcuate distance between the crowns of adjacent teeth around the periphery of cam disc 342 is not uniform. Thus, the distance between the plateau 347 and the crest of the next adjoining tooth 351, which corresponds to the first frame of film on the roll of film in the film magazine, is greater than the distance from the crest of tooth 351 to the crest of the next succeeding tooth 352, which corresponds to the second frame of film on the roll. Similarly, the spacing between the crest of tooth 352 and that of the next tooth adjoining 352 is even less, and so on about the disc until the plateau is again reached. The valleys between adjacent teeth correspond to respective successive frames of film in the film magazine.

The reason for the difference in distance between the plateau 347 and tooth 351, and between tooth 351 and tooth 352, as well as all the other teeth in the first zone, is directly related to the advancement of the film 19 in the film magazine 14. The film is advanced from the idler spool 109 to the spool 112 which is driven by the magazine gear 332. As the film is unwound from the idler spool 109 and rolled upon the gear driven spool 112, the diameter of the roll of film increases on the gear driven spool 112. Therefore, less movement of the gear driven spool 112 is needed to advance each successive frame of the film as it is exposed. The spacing between successive teeth in the first zone is such that the successive frames of film are advanced a substantially equal amount.

In the case of the second zone, FIGURE 22, valley 346, which is between what may be considered the last tooth 353 of the first zone and the plateau 347, is shallower than the valleys between the other teeth. This valley 346 corresponds to the tailend portion of the film.

The cam follower 280 on lever 273 of the second linkage system 24 is inclined to substantially the same degree as the inclined front edge 348 on each tooth. In this way, as the cam disc 342 is rotated, the cam follower 280 rides upon the inclined front edge 348 of each tooth, over the crest and then rapidly drops to the valley behind each tooth.

When the cam follower 280 drops into each successive valley except valley 346 behind either the plateau or any one of the teeth, the resulting movement of the lever 273 will disengage contact 278 from the free end 306 of the lever 264, thus opening the electrical circuit and shutting off the driving means 26, with a new frame of the film in position to be exposed by subsequent actuation of one of the buttons 217, 218 or 219. At the same time, the dropping of the cam follower will result in lever 288 dropping down sufficiently, so that its stop projection 289 will release the cam 177 on shutter blade 73 as in FIGURE 7 so that the shutter blade 73 returns to its original starting position in which pawl 166 engages shoulder 164 on shutter blade 73.

When the cam follower 280 passes over the last tooth 353 into the valley 346, the lever 273 will also move sufficiently to disengage contact 278 from the free end 306 of the lever 264 so as to open the electrical circuit and shut off the driving means 26. However, when the cam follower 280 thus passes over the crown of the last tooth 353, it does not drop as far as in the case of the other teeth, and as a result lever 273 and lever 288 do not return to the normal position, but assume a position close to that of FIGURE 22, with the cam 177 locked against the stop projection 289 on lever 288. The shutter assembly 14 is then temporarily locked in the position illustrated in FIGURES 22 and 23 until the film magazine 14 is removed which results in releasing U-shaped lever 292. This results in contacts 278 and 304 engaging to close a circuit to energize the driving means 26 and again advance the cam disc 342.

The cam follower 280 then rides up the inclined front edge 354, FIGURES 22 and 23, of the plateau 347 and along the crown of the plateau until the cam 345 on shaft 336 engages the bight 303 of the U-shaped lever 292. The cam 345 moves the lever 292 to the solid line position shown in FIGURE 25, which effectively separates the contacts 278 and 304 and opens the circuit, shutting off the driving means 26. The cam follower 280 is left in an intermediate position on the plateau 347, and the metering structure 28 is now set for advancing the lead-in portion of the film 19 in the film magazine 14. When the magazine 14 is attached to the camera case 10 the lever 292 is moved to the position illustrated in FIGURE 24. The cam edge 305 of lever 292 slides out from under the free end 306 of lever 264 and the free end 306 engages the contact 278 to again close an electrical circuit to energize the driving means 26 to advance the lead-in portion of the film in the film magazine. The cam follower 280 then rides further along the plateau 347 until the vertical back edge 355 of the plateau is reached when the cam follower drops into the valley between the plateau 347 and the first tooth 351. The lever 273 and the lever 288 return to a position which releases the cam 177 and the shutter blade 73 returns to its original starting position in which the pawl 166 engages shoulder 164 on shutter blade 73. As aforesaid, this movement of lever 273 also disengages contact 278 from the free end 306 of the lever 264, thus opening the electrical circuit and shutting off the driving means 26 until such time as one of the buttons 217, 218 or 219 is depressed.

On the upper end of the shaft 336, FIGURE 10, is a normally horizontally disposed, circular disc 356 that has on its upper side and distributed about its peripheral edge a plurality of numbers for designating the number of frames of film remaining to be exposed. As the disc 356 is caused to rotate, the numbers appear and are visible through the window 97. When the first frame of film is in position to be exposed, the first number to appear in the window 97 corresponds to the total number of frames to be exposed, the number appearing in window 97 decreasing digitally as each frame is exposed. The number 1 will appear in the window when only the last frame remains to be exposed. In other words, the numbers appearing in the window 97 indicate the number of frames of film remaining to be exposed, rather than the number of frames of film that have already been exposed as in conventional cameras.

Reference will now be made to FIGURE 32, which is a wiring diagram showing a presently preferred electrical circuit employed in the camera. It will be seen that the connector means 66 for charging the battery comprising cells 36 includes a pair of electrical terminals 66a and 66b which are electrically connected to opposite terminals of the battery, so that the battery can be charged by applying a suitable direct current charging voltage to the terminals 66a and 66b.

Referring at first to the electrical circuit for motor 27, one terminal of the battery is electrically connected to one terminal of the motor 27 by a conductor 360. Another conductor 362 is electrically connected to the other battery terminal, and is also electrically connected to the contact 304 and to the free end 306 of lever 264. Contact 278 is electrically connected to the other motor terminal by means of a further conductor 364. The contacts 278 and 306 will engage to complete the electrical circuit to motor 27 and thereby actuate the driving means 26 as part of the operative sequence when the shutter blade 73 is released by actuating one of the buttons 217, 218 and 219. On the other hand, the contacts 278 and 304 will engage to complete the electrical circuit to motor 27 and thus actuate the driving means 26 when the film magazine 14 is removed from the case.

The light source, designated generally by the numeral 23, is connected to one terminal of the battery by a conductor 366, and is selectively connected to the other battery terminal through conductor 362, master switch 75 and a conductor 368. The conductor strip 92 of switch 75 is connected to conductor 362, while the conducting pin 88 of switch 75 is connected to the conductor 368.

The light source includes a gas discharge tube 370 which produces the actual light flash for illuminating the subject, as well as the means for producing a high voltage pulse for energizing the gas discharge tube 370. Briefly, this means for producing the high voltage pulse includes a square wave oscillator or generator circuit 372 which is energized by current from the battery through the conductors 366 and 368 when the switch 75 is closed by raising of the dust cover 85. The continuous pulses from oscillator or generator circuit 372 are fed through a step-up transformer 374 to a voltage doubler circuit 375, which feeds the main charge condenser 37 so as to keep condenser 37 in a state of constant charge in readiness for the sudden discharge through the gas discharge tube 370 when a picture is taken. A neon indicator light circuit 376 may be disposed across the main charge condenser 37 to provide a continuously flashing light to indicate that the master switch 75 is closed and that the battery is at the required state of charge for proper operation of the camera. If the battery is discharged to too great an extent, the indicator light will not flash, even when the master switch 75 is closed.

The main charge condenser 37 is connected to the gas discharge tube 370 by means of a triggering circuit 378 which includes as components thereof the contacts 261 and 262 which are momentarily closed to energize tube 370 in response to movement of the shutter blade 273 when the exposure opening 163 in the shutter blade registers with the lens 117.

It will be noted that a third terminal 66c has been shown as a part of the connector means 66 for charging the batteries. This added terminal 66c is optional, and is adapted to cooperate with a timer device which may be incorporated with the charger. The camera may be connected to the charger whenever it is not in use, and periodically (for example, for a short interval every 12 hours) the timer would electrically connect terminals 66b and 66c so as to actuate the circuit of light source 23, thus to periodically apply a charging voltage across the main condenser 37 and run a discharging current through the battery cells 36. This will prevent distortion of the main condenser 37, and will prevent the battery cells from gassing up. By this means the camera may be left connected to the charger for long periods of time, and will at all times be immediately ready for use, with the condenser 37 and the battery cells 36 at full strength.

It is to be understood that the electrical circuit diagrammatically illustrated in FIGURE 32 is merely a presently preferred circuit, and that variations may be employed for accomplishing similar end results without departing from the present invention.

Operation

The operation of the invention is broadly divided into two parts: (1) when the camera is set for indoor operation as indicated in FIGURE 1, and (2) when the camera is set for outdoor operation as indicated in FIGURE 4. Each broad division of operation is further divided into three parts. The indoor operation comprises taking photographs at (a) "Distance," (b) "Average," and (c) "Close" ranges. Taking photographs when the subject is at a distance of 10–15 feet is accomplished by depressing button 217, marked "Distance," to actuate lever 211. When the picture subject is at a distance of 5–9 feet, which is considered average, button 218 is depressed, which actuates lever 212. Depressing button 219, marked "Close," to actuate lever 213 takes portrait photographs of a picture subject 3–4 feet from the camera.

The outdoor operation of the camera is likewise divided into taking photographs at (a) "Distance," (b) "Average" and (c) "Close" ranges. When the picture subject is in bright sunlight 6 feet to infinity away from the camera, button 217 is depressed to actuate lever 211. When the light conditions are dull or the picture subject is in shade and 6 feet to infinity away from the camera, lever 212 is actuated by depressing button 218. Again, if a portrait photograph is desired and the picture subject is 3–4 feet from the camera, then button 219 is depressed to actuate lever 213.

In order that the operation of the camera be completely understood, each of the six enumerated operations will be considered in the order given beginning with (1) (a), indoor operation when the subject is approximately 10–15 feet from the camera.

Figure 3:
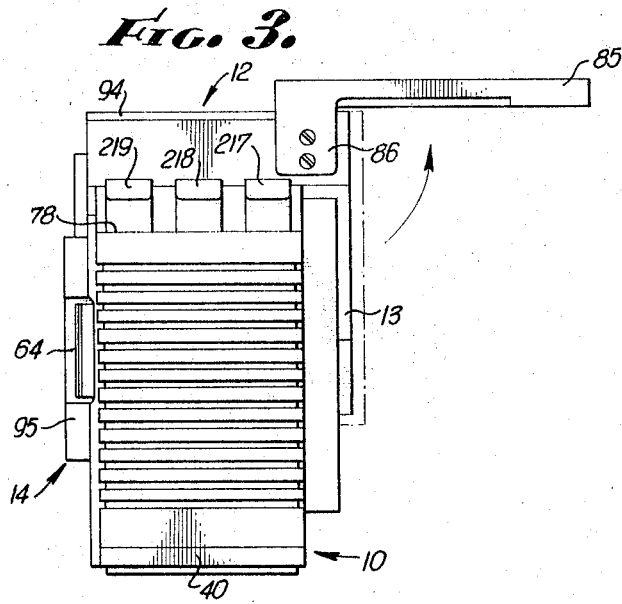
FIGURE 3 is a side elevational view of the camera illustrating a dust cover in the open position.

The dust cover 85 is pivoted to the up position as in FIGURE 3 and the master switch 75 is therefore closed as shown in FIGURE 9.

Particular attention is directed first to FIGURE 15 which illustrates the manually operated linkage system 20 in position for indoor operation. The plate 193 is shifted to the left, plate 201 being in an overlying relationship with respect to lever 211 and the projection 225 on lever 211 is in contacting engagement with plate 201, FIGURE 14.

FIGURE 17 illustrates the next steps of the actual operation. Button 217 is depressed. Immediately the lever 211 is urged to pivot about its axis, shaft 185, in an anticlockwise direction, as the operation is viewed in FIGURE 17. The projection 225 on lever 211 contacting plate 201 forces plate 201 to pivot about its axis, shaft 186. The lever 203, through arm 205, is caused to pivot about its axis, shaft 186, in an anticlockwise direction. Arm 205 is in continuous contacting relationship with plate 201 and integral with lever 203. Finger 204, on lever 203, immediately causes blade 136 to pivot in a clockwise direction about its axis, shaft 130. The end of the blade 136 having the opening 138 therein is withdrawn from the slot 134 of the lens unit 16.

As the button 217 is further depressed finger 143 on blade 136 engages finger 144 on the apertured blade 135 to also cause blade 135 to pivot about its axis, shaft 130. The end of the blade 135 having the opening 137 therein is thus withdrawn from the slot 134.

With the two apertured blades 135 and 136 withdrawn from the slot 134, the photographic lens 117 has a maximum aperture for taking indoor photographs when the picture subject is 10–15 feet from the camera.

Still further depression of the button 217 and actuation of the lever 211 brings the latter into engagement with the extension 208 on the bight 209 of the U-shaped member 210. As viewed in FIGURE 17, the U-shaped member 210 is caused to pivot in an anticlockwise direction about its axis, shaft 185. The lever 240 on the bight 209 of U-shaped member 210 is also caused to rotate in an anticlockwise direction, which effectively removes the shield 241 from the opening 53, FIGURES 9 and 11, in the camera case 10. With the removal of the shield 241 from before opening 53, an edge of the film 19 in the film magazine 14, is now exposed to the light source 23. When the light source 23 is energized, the edge of a frame of film 19 is provided with an indexing exposure mark.

Substantially simultaneously with the actuation of indexing lever 240, the extension 242 which is a component of the U-shaped member 210, FIGURE 19, is caused to pivot about its axis, shaft 185. Since the extension 242 is in intimate engagement with the L-shaped pawl 166, the pawl 166 is pivoted so that its finger 165 is removed from engagement with the shoulder 164 on the shutter blade 73, thus releasing the shutter blade.

The depression of the button 217 is limited by the extension 224 thereon striking the stop shoulder 78 on the camera case 10.

Although it has been necessary to describe the depression of the button 217 as occurring in stages in order to clearly illustrate the sequence of operations, it is to be understood that in reality the button is depressed to its limit in one continuous motion without any hesitations or dwell time.

The shutter blade 73 is spring loaded to rotate in a clockwise direction, as the operation is viewed in FIGURE 19. Spring loading of the shutter blade 73 s accomplished through the medium of the clutch 171 in the manner described in the section devoted to the description of the shutter assembly 18.

As the shutter blade 73 rotates, the exposure opening 163 therein comes into registration with the photographic lens 117, resulting in photographically exposing one frame of the film 19.

As the shutter blade 73 rotates, the cam 117 attached to the shutter blade 73 sequentially actuates the first linkage system 22, FIGURE 19, and the second linkage system 24, FIGURE 20, in the order given, for sequentially energizing the light source 23 and energizing the driving means 26. The first stage of the sequence occurs when the cam 177 momentarily engages the free end 259 of the lever 254 at substantially the same instant as the exposure opening 163 in the shutter blade 73 completely registers with the photographic lens 117. The lever 254 is forced, by cam 177, to pivot in a clockwise direction about its axis, pin 256, as the operation is viewed in FIGURES 7 and 19. This results in contact 261, on end 260 of the lever 254, engaging the fixed contact 262 to close an electrical circuit to energize the source of light 23 which momentarily illuminates the picture subject.

After the cam 177 thus causes the light source 23 to be energized it continues to rotate, with the shutter blade 73, to actuate the second linkage system 24 which includes engaging or striking the surface 272 of the lever 273. Opening 163 in shutter blade 73 is at this time out of registration with the photographic lens 117 and the lever 254 is no longer under the influence of the cam 177. The spring 263 therefore, urges the lever 254 to the position illustrated in FIGURE 20 whereby the contact 261 is moved away from contact 262 and the circuit energizing the light source 23 is broken or opened.

The cam 177, striking surface 272, urges the lever 273 to pivot about its axis, shaft 130, in an anticlockwise direction as the operation is viewed in FIGURE 20. The contact 278 on the lever 273 engages the free end 306 of the lever 264 to close an electrical circuit to energize the motor 27 of the driving means 26.

Also, the pivoting of the lever 273 lifts the cam follower 280, from the valley between the plateau 347 and the first tooth 351 of the metering structure 28, FIGURE 20, presuming that the film frame just exposed by depressing button 217 is the first frame on the roll of film.

Meanwhile, the cam 177 has struck the projection 313 on lever 273 at the lower end of the surface 272 and the rotation of the shutter blade 73 is momentarily halted.

The closing of the electrical circuit energizing motor 27 actuates the gear train 322 of the driving means 26. The gear train 322 transfers rotary motion from the motor 27 to the gear 298 which, through shaft 297, gear 299, gear 337, shaft 333, gear 334 and gear 335, causes the metering structure 28 to rotate in a clockwise direction, as the operation is viewed in FIGURES 6 and 11. This same rotating motion is transferred from gear 292 to the gear 332 in the film magazine 14 which results in advancing the film 19 from the exposed frame to an unexposed frame.

When the cam disc 342 of the metering structure 28 is caused to rotate the inclined front edge 348 of tooth 351 moves against the cam follower 280. The cam follower 280 is urged to ride over the inclined front edge 348 to the crown of the tooth 351. This movement of the cam follower 280 is conveyed to the lever 273 and additional anticlockwise rotation is imposed thereon. With this additional pivoting of the lever 273, the projection 313 on lever 273 is removed from the path of rotation of the cam 177.

While the cam 177 has been temporarily delayed in its path of rotation by projection 313, the clutch 171 of the shutter assembly 18, through the gear train 322, has, again, been partially spring loaded in the manner described in that section devoted to the shutter assembly 18. The spring loading of the shutter assembly 18 will continue until the cam follower 280 drops into the valley between the first tooth 351 and the second tooth 352 immediately following.

When the projection 313 is removed from the path of rotation of the cam 177, the cam continues on its path of rotation until it strikes the stop projection 289 on lever 288. The stop projection 289 is brought into the path of the cam 177 in the following manner: The action of the cam follower 280 in riding up the incline 348 of tooth 351 has lifted lever 273, in opposition to the urging of the spring 285. The lever 282, hooked to lever 273, and lever 288, connected to lever 282, are caused to pivot in an anticlockwise direction, about the axis 284 of lever 282, as the operation is viewed in FIGURE 21. This, therefore, brings the stop projection 289 into the path of travel of the cam 177 where the shutter assembly 18 is momentarily stopped.

The clutch 171 of the shutter assembly 18 is substantially completely spring loaded at this stage of the operation.

When the cam follower drops into the valley between the first tooth 351 and the second tooth 352, immediately following, the spring 285 urges the return of all the levers 273, 282 and 288 to the original position illustrated in FIGURE 7. The contact 278 on lever 273 is disengage from the free end 306 of lever 264 so as to open the electrical circuit and thereby stop the driving means 26. The film 19 has been advanced in the film magazine 14, and an unexposed frame of film is in alignment with the photographic lens 117 of the lens unit 16. The stop projection 289 is removed from the path of rotation of the cam 177 and the shutter assembly 18 is permitted to continue to rotate to its original starting position.

Meanwhile, the release of pressure on the button 217 has permitted the lever 211 under the influence of the spring 223 to return to its original position. The pawl 166 has also returned to its original position which is in the path of rotation of shoulder 164 on the shutter blade 73. When the shoulder 164 strikes the finger 165 on the pawl the shutter assembly 18 is brought to a complete stop.

The lens unit 16, shutter assembly 18, manually operated linkage system 20, first and second linkage systems 22 and 24 respectively, driving means 26, metering structure 28, and the film 19 in the film magazine 14 are all in position for taking another photograph.

The second enumerated operation, previously identified as (1)(b), relates to indoor operation when the picture subject is at an average distance of approximately 5–9 feet.

Particular attention is directed, first, to FIGURE 18. Button 218 is depressed to actuate lever 212. The projection 230 on lever 212 is spaced from the plate 201. Therefore, the button must be depressed a moderate amount before projection 230 engages the plate 201. When contact is made the plate 201 is again caused to pivot about its axis, shaft 186, which results in actuating lever 203. Again, the finger 204 on lever 203 engages the finger 143 on apertured blade 136 to withdraw the end of the blade 136 having the opening 138 therein from the slot 134 of the lens unit 16. Before the apertured blade 135 can be actuated, the extension 226 on button 218 strikes the shoulder 78 on the case 10 and further movement of the lever 212 is restrained. Therefore, the aperture of the photographic lens 117 is governed by the opening 138 of blade 136. Thus, the lens 117 will be set at the intermediate aperture for the average distance range of 5 to 9 feet, indoors, as less light is required than for the longer range of 10 to 15 feet discussed above under operation (1)(a).

Actuating lever 212 also initiates the focusing of the photographic lens 117, FIGURES 11 and 13.

When the lever 212 is actuated the extension 231 thereon is simultaneously actuated. The knife edge cam 232 on extension 231 engages the conical cam 149 of the lens unit 16, forcing the lens unit shaft 130 to move toward the picture subject. This movement is transferred to the entire lens unit 16 which is moved a corresponding amount. Movement of the lens unit 16 toward the picture subject results in properly focusing the lens for taking photographs of a picture subject in the range of approximately 5–9 feet away from the camera.

Subsequent to this focal adjustment of the photographic lens 117 for operation, the lever 212 strikes extension 233 of the U-shaped member 210, which again results in actuating the lever 240 and the shield 241 thereon to expose the opening 53 in the camera case 10 for the purpose of again indexing one edge of the film 19 in the film magazine 14. Simultaneously with the actuating of lever 240 is the actuation of the extension 242 on U-shaped member 210, which in turn actuates the pawl 166 to release the shutter blade 73 of the shutter assembly 18. Following the release of the shutter blade 73 the operation of the shutter assembly 18, the first and second linkage systems 22 and 24, the driving means 26 and the metering structure 28 is identical to that previously described. The shutter blade 73 and the cam 177 thereon rotates. The exposure opening 163 in the shutter blade 73 registers with the aperture of the photographic lens 117. The cam 177 engages the first linkage system 22 to momentarily close the circuit to energize the light source 23 to illuminate the picture subject. Following the actuation of the first linkage system 22 the cam 177 actuates the second linkage system 24 to momentarily energize the motor 27 of the driving means 26. The gear train 322 advances the film to the next unexposed frame, rotates the metering structure 28, and again spring loads the clutch 171 of the shutter assembly 18. The camera is again set for taking another photograph.

The third operation in the sequence for taking indoor photographs concerns taking portrait pictures when the picture subject is at a relatively close distance in the range of approximately 3–4 feet. This operation has been previously identified as (1)(c).

Depression of button 219 actuates lever 213. There is a delay from the initial act of depressing the button 219 until a subsequent operation develops. Lever 213 does not actuate the apertured blades 135 and 136 and therefore does not in any way affect the aperture of the photographic lens 117 of the lens unit 16, so that the effective aperture of lens 117 will correspond to the small opening 138 in the apertured blade 136. However, the cam projection 238 of the lever 213 is actuated to adjust the focus of lens unit 16. The edge 239 on cam projection 238 is caused to engage the conical cam 149 to again force the shaft 130 and the lens unit 16 toward the picture subject. The lens unit 16 is moved by the cam 238 a greater amount than was accomplished when the knife edge cam 232 engaged the conical cam 149 to shift the lens unit 16. Movement of the lens unit 16 by the cam 238 properly focuses the photographic lens 117 for taking indoor close-range photographs.

Depressing the button 219 until the extension 237 thereon strikes the stop 78 on the case 10, results in the lever 213 engaging the extension 251 on the bight 209 to actuate the U-shaped member 210. Again, the lever 240 and shield 241 are actuated to remove the latter from before the opening 53 in the case 10.

Actuation of the U-shaped lever 210 again results in actuating the extension 242 thereon which removes the pawl 166 from engagement with the shutter blade 73.

Following the release of the shutter blade 73, the operation of the shutter assembly 18, the first and second linkage systems 22 and 24, the driving means 26 and the metering structure 28 is identical to that previously described with respect to steps (1)(a) and (1)(b).

The following three steps of the operation will be devoted to taking photographs outdoors. FIGURES 4 and 16 illustrate that the plate 193 of the manually operated linkage system 20 has been shifted to the right, as the operation is viewed in FIGURE 16. It is to be noted that in this position of plate 193, the plate 201 overlies lever 212, but it does not overlie lever 211 or lever 213; accordingly, in the outdoor operation, the aperture will be enlarged from the smallest setting as defined by opening 138 in blade 136 only when the lever 212 is actuated for the dull or shade condition, in the range of from 6 feet to infinity.

Operation (2) (a), for bright sunlight at a range of from 6 feet to infinity, comprises depressing button 217 to actuate lever 211. Following the actuation of lever 211, the first subsequent operation that occurs is when the lever 211 engages the extension 208 on the bight 209. The U-shaped member 210 is again caused to pivot about its axis, shaft 185. The lever 240 connected to the U-shaped member 210 is actuated along with the shield 241 to expose the opening 53, in the case 10. Light, passing through the opening 53 in the case 10 and into the film magazine 14, will index the film 19. The extension 242 on the U-shaped member 210 actuates the pawl 166 to release the finger 165 thereon from the shoulder 164 on the shutter blade 73.

The shutter blade 73 is free to rotate and the operation of the shutter assembly 18, first and second linkage systems 22 and 24, the driving means 26, the metering structure 28 and the film magazine 14 is identical to that previously described.

It is to be noted that the operation of lever 211 did not actuate the apertured blades 135 and 136, so that the aperture of the photographic lens 117 corresponds to the small opening 138 that is in blade 136. Also, the focus of the photographic lens 117 of the lens unit 16 was not altered. With the photographic lens 117 set as indicated, an ideal condition is provided for taking photographs outdoors in the bright light when the picture subject is in the range of approximately 6 feet to infinity from the camera.

When the picture subject is in shade or dull light, in the range of approximately 6 feet to infinity from the camera, button 218 is depressed to actuate lever 212. This operation has previously been identified as step (2) (b). The operation of step (2) (b) is identical to the previously described operation that was devoted to the operation of step (1) (b).

Operation (2) (c) which is devoted to taking close range or portrait photographs outdoors, when the picture subject is about 3–4 feet from the camera, is identical to the operation of lever 213 that has been previously described under the heading (1) (c).

The operation of the six steps may be summarized rather simply. When buttons 218 and 219 are depressed exactly the same thing happens whether the picture is taken indoors or outdoors, and this is true regardless of the position of plate 201. Depression of button 218 alters the aperture of the lens 117 so that it is set at the intermediate opening, and the lens unit is shifted to the intermediate focal position. Depression of button 219 alters the lens aperture to the largest opening, and shifts the lens unit forwardly the largest amount, to the close range focal position.

When button 217 is depressed and the setting of the camera is for indoor photographs, the aperture of the photographic lens 117 is opened to the largest aperture, but the focus is not altered. When button 217 is depressed and the setting of the camera is for outdoor photographs, the actuation of lever 211 does not affect either the aperture or focus of the photographic lens 117, the aperture being set at the smallest opening.

The final two operations of the camera to consider are the advancing of the lead-in portion of the film and the advancing of the tail-end portion as controlled by the metering structure 28.

The advancing of the tail-end portion will be considered first and in this connection attention is direct particularly to FIGURES 22, 23 and 24. The first and second linkage systems 22 and 24, the shutter assembly 18 and the metering structure 28 are in the positions shown in FIGURE 22. The control cam disc 342 has been rotated by exposing all of the frames on the film strip until, after exposing the last frame, the cam follower 280 of the second linkage system 24 has dropped into the last valley of the cam disc 342, which is the shallow valley 346. This prevailing condition does not permit lever 273 to drop, under the urging of spring 285, a sufficiently great amount to allow cam 177 on the shutter assembly to pass stop projection 289. The lever 273, under the urging of spring 285, does move a sufficient amount to break the electrical contact between free end 306 of lever 264 and the contact 278. The free end 306 of the lever 264 is prevented from following the contact 278 when the lever strikes stop 312. Therefore, the driving means 26 is shut off. The user of the camera can observe the position of the film therein by looking through the window 97 at the indicator disc 356 which indicates the number of frames of film yet to be exposed. The indicator disc 356 will show that the film 19 has been completely exposed. Therefore, in order that the camera may be used again, it is necessary to remove the film magazine 14. When this happens the bias on the lever 292 is moved to the position illustrated in FIGURE 25 by virtue of the biasing force of spring 313 that is attached to the lever 292 and to the pin 314 mounted on the body 29.

When the leg 300 projects through the opening 52 the contacts 278 and 304 engage to close the electrical circuit to energize the driving means 26. The energized driving means 26 advances or rotates the cam disc 342. The cam follower 280 is forced up the front inclined edge 354 at the leading end of plateau 347 and thence along a portion of plateau 347. The cam 345 on shaft 343 rotates from the position illustrated in FIGURE 24 to the position illustrated in FIGURE 25. The cam 345 strikes the bight 303 of the lever 292 to urge the lever 292 from the dotted line position to the solid line position, FIGURE 25. When the lever 292 is thus to the solid line position in FIGURE 25 it opens the electrical circuit to the driving means 26 by separating the contacts 278 and 304, leaving the shutter assembly 18 and the second linkage system in the positions illustrated in FIGURE 23. Since levers 273, 282 and 288 are in the raised position, the cam 177 is prevented from passing the projection stop 289 on lever 288.

The camera cannot be operated until a film magazine 14 is attached to the camera case 10.

With a film magazine 14 attached to the case 10, the lever 292 is moved to the position illustrated in FIGURE 24. The cam edge 305 slides out from under the free end 306 of lever 264 to permit the free end 306 to engage contact 278 to close the electrical circuit to energize the driving means 26.

The driving means 26 again rotates the cam disc 342 with the cam follower 280 riding along the plateau 347. Under these conditions the lead-in portion of the film in the film magazine 14 is advanced.

The cam disc 342 will continue to rotate until the valley between the plateau 347 and the first tooth 351 comes under the cam follower 280. The cam follower 280 will immediately drop, under the influence of spring 285, to the bottom of this first valley. The spring 285 will urge lever 273 to the position illustrated in FIGURE 7 which will result in separating the contacts 278 and 304 to open the electrical circuit and de-energize the motor 27 of the driving means 26.

Additionally, the spring 285 will urge levers 282 and 288 to the position illustrated in FIGURE 7. The stop projection 289 will thus be removed from the path of rotation of the cam 177, and the shutter assembly 18 will be permitted to rotate to the original starting position where the pawl 166 will engage the shoulder 164 on the shutter blade 73.

The lead-in portion of the film has been advanced in the film magazine 14, and the first frame of the film is in alignment with the photographic lens 117 so that the camera is set for taking the first photograph, with one exception only: It must be determined whether the photograph is to be taken indoors or outdoors. Therefore, the final setting of the camera will be delayed until the locale of the photograph is determined, and then the plate 193 will be moved to the proper setting.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent apparatus.

I claim:

1. A camera comprising a camera case; a photographic lens unit in said case; a film loaded magazine in alignment with and spaced from said lens unit and removably attached to said case; a shutter assembly a portion of which is in alignment with said lens unit; manually operable means connected to said shutter assembly for actuating the shutter assembly to admit light through said shutter assembly; an electrically energized driving means connected to said film magazine for advancing a lead-in portion thereof, for advancing the film from frame to frame, and for advancing a tail-end portion of the film; and electrical circuit means electrically connected to said driving means and actuated by said magazine when the magazine is initially attached to said case to energize said driving means to advance the lead-in portion of the film; said electrical circuit means being further actuated by said shutter assembly to momentarily energize said driving means to advance said film from frame to frame and to advance the tail-end portion of the film.

2. A camera comprising a camera case; a film loaded magazine removably attached to said case; a light path in said camera case and magazine including registered openings therein through which light may pass to index said film; a photographic lens unit in said case in alignment with and spaced from the film in the magazine; a shutter assembly a portion of which is between said lens unit and film; manually operable means connected to said shutter assembly for actuating said shutter assembly to expose said film; and a shield in said light path which is connected to said manually operable means and actuated thereby to be withdrawn from said light path substantially simultaneously as the shutter assembly is actuated; an electrically energized driving means connected to said film for advancing a lead-in portion thereof; for advancing the film from frame to frame, and for advancing a tail-end portion of the film; and electrical circuit means electrically connected to said driving means and actuated by said magazine when the magazine is initially attached to the case to energize the driving means and advance the lead-in portion of the film; said electrical circuit means being further actuated by said shutter assembly to momentarily energize said driving means to advance said film from frame to frame and to advance the tail-end portion of the film.

3. A camera comprising a case; a photographic lens unit in said case; a film magazine removably attached to said case in alignment with and spaced from said lens unit; a shutter blade assembly including a rotatable, spring loaded shutter blade aligned with said lens unit; a cam connected to said shutter blade; a manually operable linkage system connected to said shutter blade for actuating said shutter blade; an electrically energized motor; a further linkage system electrically connected to said motor through motor switch means which is normally open; said further linkage system being actuated by said cam to momentarily close said motor switch means to energize said motor; said further linkage system having a lever thereon associated with said motor switch means and engageable by said magazine when the latter is attached to said case to close said motor switch means; a gear train connected to said motor, film magazine, and shutter blade assembly for advancing film in said magazine and spring loading the shutter blade assembly; and metering structure operatively associated with said gear train and further linkage system for opening and closing said motor switch means.

4. A camera comprising a case; a photographic lens unit in said case; a film magazine removably attached to said case in alignment with and spaced from said lens unit; a shutter blade assembly including a rotatable, spring loaded shutter blade aligned with said lens unit; a cam connected to said shutter blade; a manually operable linkage system interconnected to said shutter blade for actuating said shutter blade; an electrically energized motor; a further linkage system electrically connected to said motor through motor switch means which is normally open; said further linkage system being actuated by said cam to momentarily close said motor switch means to energize said motor; said further linkage system having a lever thereon associated with said motor switch means and engageable by said magazine when the latter is attached to said case to close said motor switch means; a gear train connected to said motor, film magazine, and shutter blade assembly for advancing film and spring loading the shutter blade assembly; metering structure operatively associated with said gear train and further linkage system for opening and closing said motor switch means; and a source of electric power disposed in said case.

5. Film control mechanism for a camera comprising a film loaded magazine removably attached to a camera case; an electrically energized motor in an electrical circuit; a gear train connected to said motor and said magazine for sequentially advancing the film in three steps comprising (1) advancing a lead-in portion of the film, (2) advancing each frame of the film as it is exposed, and (3) advancing a tail-end portion of the film; a cam disc rotatably connected to said gear train; said cam disc being divided generally into three zones corresponding to said three steps of advancing the film; a linkage system in the electrical circuit that when actuated opens and closes said electrical circuit; said linkage system having a portion thereof which is engaged by said magazine and at the moment of attachment of the magazine to the camera case closes said electrical circuit to advance the film through step (1) to step (2); said linkage system having a cam follower thereon that engages said cam disc and that in cooperation with said cam disc meters said three-step advancement of said film; a camera shutter mechanism; a cam connected to and actuated by said shutter mechanism, said cam engaging and actuating the linkage system to open the electrical circuit following the advancement of the film through step (3).

6. Film control mechanism according to claim 5 wherein the cam disc is divided into three zones corresponding to the three steps of advancing the film, the first zone being a plateau free of teeth, the second zone including a plurality of teeth therein having non-uniform spacing but uniform depth therebetween, and the third zone being a valley between the second and first zones and having a depth that is nonuniform with respect to the depth between the teeth of the second zone.

7. A still picture camera which comprises a camera case, a photographic lens unit in the case, a shutter assembly in said case and including a shutter aligned with said lens unit, said shutter assembly including manually operable means connected to said shutter for actuating said shutter to admit light through said lens unit, a film magazine removably secured to the case, said magazine having an elongated strip of film therein and having rotatable film winding means therein to which the film strip is secured, a portion of said film strip being aligned with said lens unit for exposure of said film portion upon actuation of said shutter assembly, driving means in the case, a drive connection between said driving means and said film winding means for rotating said film winding means to advance the film strip in the magazine, said drive connection being disconnectable to permit removal of the film magazine from the case, said driving means comprising a motor, means connected to said motor and actuated by said shutter assembly to start said motor for advancing the film from one frame to the next, and metering means for stopping said motor when said next frame is aligned with said lens.

8. A camera as defined in claim 7, wherein said motor is electrically actuated.

9. A still picture camera which comprises a camera case having a front and a rear, a photographic lens unit in the front of the case, a shutter assembly in said case and including a shutter aligned with said lens unit, said shutter assembly including manually operable means connected to said shutter assembly for actuating said shutter assembly to admit light through said lens unit, a film magazine removably mounted in the back of the case, said magazine comprising a housing having a generally flat back wall, a film winding spool rotatable in said housing generally forward of said back wall, wall means in the housing defining a film-receiving chamber spaced from said spool and also located generally forward of said back wall, an elongated strip of film in said chamber and extending out of said chamber and being secured to said spool, a portion of said film strip between said chamber and said spool being exposed to the exterior of said housing within said camera case, said portion of the film strip being disposed adjacent to said back wall of the magazine forward of and generally parallel to said back wall, driving means in the case including a rotary power output member, a rotary power input member on said magazine axially aligned with and connected to said spool so that said power input member and said spool rotate together as a unitary structure, said power input member having at least a portion thereof exposed to the exterior of said magazine housing and releasably engaging said power output member for rotating the spool to advance the film strip in the magazine in direct response to rotation of said power output member, said camera case having an opening in the back thereof, said magazine being seated in said opening with said chamber and spool extending into said camera case, a back wall of said magazine being substantially parallel to and closely adjacent said back of the camera case.

10. Film control mechanism for a camera comprising a film loaded magazine removably attached to a camera base; electrically energized driving means connected to said magazine for sequentially advancing the film in three steps comprising (1) advancing a lead-in portion of the film, (2) advancing each frame of the film as it is used, and (3) advancing a tail-end portion of the film; a linkage system electrically connected to said driving means and operatively associated with and actuated by a camera shutter assembly to close an electrical circuit to energize the driving means to advance the film through steps (2) and (3); said linkage system being engaged and actuated by said magazine when the magazine is initially attached to the case, to close an electrical circuit to energize the driving means to advance the film through step (1); and structure connected to said driving means and associated with said linkage system that meters said three-step advancement of said film, said structure including a cam divided into a plurality of zones, one zone having a plateau and a tooth defining a valley adjacent to said plateau, and said linkage system including a cam follower that engages said plateau and subsequently moves off of the plateau and into the valley to open the electrical circuit to limit step (1).

11. Film control mechanism for a camera comprising a film loaded magazine removably attached to a camera case; electrically energized driving means connected to said magazine for sequentially advancing the film in three steps comprising (1) advancing a lead-in portion of the film, (2) advancing each frame of the film as it is used, and (3) advancing a tail-end portion of the film; a linkage system electrically connected to said driving means and operatively associated with and actuated by a camera shutter assembly to close an electrical circuit to energize the driving means to advance the film through steps (2) and (3); said linkage system being engaged and actuated by said magazine when the magazine is initially attached to the case, to close an electrical circuit to energize the driving means to advance the film through step (1); and structure connected to said driving means and associated with said linkage system that meters said three-step advancement of said film, said structure including a cam divided into a plurality of zones, one zone having a series of valleys therein defined by a plurality of teeth, and said linkage system including a cam follower that follows the contour of said cam and each time the cam follower drops into a valley it opens the electrical circuit to limit step (2).

12. Film control mechanism for a camera comprising a film loaded magazine removably attached to a camera case; electrically energized driving means connected to said magazine for sequentially advancing the film in three steps comprising (1) advancing a lead-in portion of the film, (2) advancing each frame of the film as it is used, and (3) advancing a tail-end portion of the film; a linkage system electrically connected to said driving means and operatively associated with and actuated by a camera shutter assembly to close an electrical circuit to energize the driving means to advance the film through steps (2) and (3); said linkage system being engaged and actuated by said magazine when the magazine is initially attached to the case, to close an electrical circuit to energize the driving means to advance the film through step (1); and structure connected to said driving means and associated with said linkage system that meters said three-step advancement of said film, said structure including a cam having a recess therein, and said linkage system including a cam follower that follows the contour of said cam and each time it falls into said recess it opens the electrical circuit to limit step (3).

References Cited by the Examiner

UNITED STATES PATENTS

| | | | |
|---|---|---|---|
| 1,612,860 | 1/1927 | Fairchild | 95—12.5 |
| 2,074,767 | 3/1937 | Aichele | 95—53 |
| 2,273,876 | 2/1942 | Lutz | 95—1.1 |
| 2,409,605 | 10/1946 | Bolsey | 95—31 |
| 2,469,688 | 5/1949 | Fuerst | 95—11.5 |
| 2,492,127 | 12/1949 | Hessert | 88—24 |
| 2,539,499 | 1/1951 | Walters | 95—42 |
| 2,550,698 | 5/1951 | King | 95—42 |
| 2,638,825 | 5/1953 | Fairbanks | 95—59 |
| 2,679,790 | 6/1954 | Clark | 95—31 |
| 2,738,704 | 3/1956 | Hintz | 88—24 |
| 2,795,175 | 6/1957 | Foster | 95—58 |
| 2,917,984 | 12/1959 | Faulhaber | 95—64 |
| 2,929,307 | 3/1960 | Trum | 95—64 |
| 2,938,444 | 5/1960 | Kellner | 95—45 |
| 2,983,207 | 5/1961 | Gebele | 95—10 |
| 3,005,395 | 10/1961 | Mahn | 95—64 |
| 3,007,385 | 11/1961 | Fukuoka | 95—31 |
| 3,048,092 | 8/1962 | Gottschalk | 95—45 |

JOHN M. HORAN, *Primary Examiner.*

NORTON ANSHER, *Examiner.*